(12) United States Patent
Jia et al.

(10) Patent No.: US 11,303,418 B2
(45) Date of Patent: Apr. 12, 2022

(54) RESOURCE ALLOCATION METHOD AND RELATED DEVICE AND SYSTEM

(71) Applicant: Huawei Technologies Co., Ltd., Shenzhen (CN)

(72) Inventors: Qiong Jia, Shanghai (CN); Jun Zhu, Shenzhen (CN); Weiwei Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 16/522,305

(22) Filed: Jul. 25, 2019

(65) Prior Publication Data

US 2019/0349178 A1 Nov. 14, 2019

Related U.S. Application Data

(63) Continuation of application No. PCT/CN2018/074220, filed on Jan. 26, 2018.

(30) Foreign Application Priority Data

Jan. 26, 2017 (CN) .......................... 201710062965.7
Jun. 9, 2017 (CN) .......................... 201710434527.9

(51) Int. Cl.
*H04L 5/00* (2006.01)
*H04L 27/26* (2006.01)
(Continued)

(52) U.S. Cl.
CPC ........ *H04L 5/0064* (2013.01); *H04L 27/2666* (2013.01); *H04W 72/0413* (2013.01); *H04W 76/18* (2018.02)

(58) Field of Classification Search
None
See application file for complete search history.

(56) References Cited

U.S. PATENT DOCUMENTS

2011/0222489 A1\* 9/2011 Awad .................... H04L 5/0039
370/329
2015/0085794 A1 3/2015 Chen et al.
(Continued)

FOREIGN PATENT DOCUMENTS

CN 105557050 A 5/2016
CN 105814829 A 7/2016
(Continued)

OTHER PUBLICATIONS

3GPP TSG RAN WG1 meeting #84, St. Julian's, Malta, Feb. 15-19, 2016 (Year: 2016).\*

(Continued)

*Primary Examiner* — Kenny S Lin
(74) *Attorney, Agent, or Firm* — Leydig, Voit & Mayer, Ltd.

(57) ABSTRACT

Embodiments of this application disclose a resource allocation method and a related device and system. The method may include: allocating a resource group including M first resource blocks to a terminal when allocating uplink resources, where an occupancy ratio of a frequency spacing formed by the M first resource blocks to a system bandwidth is greater than a preset threshold, and the resource group further includes N second resource blocks in any frequency domain positions, where M≥2, N≥1, and both M and N are positive integers; and sending resource indication information to the terminal, where the resource indication information includes information about the resource group. According to the embodiments of this application, scheduling of uplink resources can be more flexible for use of an unlicensed frequency band while the OCB requirement of ETSI is met.

20 Claims, 13 Drawing Sheets

(51) Int. Cl.
*H04W 72/04* (2009.01)
*H04W 76/18* (2018.01)

(56) References Cited

U.S. PATENT DOCUMENTS

| | | | |
|---|---|---|---|
| 2015/0085797 A1 | 3/2015 | Ji et al. | |
| 2015/0092702 A1 | 4/2015 | Chen et al. | |
| 2015/0146670 A1* | 5/2015 | Liu | H04L 5/0007 370/329 |
| 2015/0156638 A1 | 6/2015 | Yerramalli et al. | |
| 2015/0237607 A1* | 8/2015 | Frederiksen | H04L 5/0053 370/329 |
| 2016/0036578 A1 | 2/2016 | Malladi et al. | |
| 2016/0037352 A1* | 2/2016 | Wei | H04W 72/1268 455/454 |
| 2017/0135084 A1* | 5/2017 | Kuchibhotla | H04W 24/08 |
| 2017/0273056 A1* | 9/2017 | Papasakellariou | H04W 52/143 |
| 2017/0302493 A1* | 10/2017 | Yang | H04L 1/0029 |
| 2019/0260530 A1* | 8/2019 | Yl | H04L 5/0041 |
| 2019/0342874 A1* | 11/2019 | Davydov | H04L 5/0094 |

FOREIGN PATENT DOCUMENTS

| | | | | |
|---|---|---|---|---|
| CN | 105827371 A | 8/2016 | | |
| CN | 106162889 A | 11/2016 | | |
| EP | 3793151 A1 * | 3/2021 | | H04L 5/0053 |
| JP | 2016532331 A | 10/2016 | | |
| JP | 2016536845 A | 11/2016 | | |
| WO | 2016019243 A1 | 2/2016 | | |
| WO | 2016022305 A1 | 2/2016 | | |
| WO | 2016141989 A1 | 9/2016 | | |

OTHER PUBLICATIONS

"UL waveform for LAA PUSCH," 3GPP TSG-RAN WG1 Meeting #84, St. Julian's, Malta, R1-160775, pp. 1-9, 3rd Generation Partnership Project, Valbonne, France (Feb. 15-19, 2016).
"Status Report to TSG:Work Item on Enhanced LAA for LTE," 3GPP TSG RAN meeting #72, Busan, Korea, RP-160876, pp. 1-13, 3rd Generation Partnership Project, Valbonne, France (Jun. 13-16, 2016).
"PUSCH transmission in LAA," 3GPP TSG RAN WG1 meeting #84,St Julian's, Malta, R1-160625, pp. 1-6, 3rd Generation Partnership Project, Valbonne, France (Feb. 15-19, 2016).
"Resource allocation for RB interleaved PUSCH for eLAA," 3GPP TSG RAN WG1 Meeting #84bis, Busan, Korea, R1-162583, total 8 pages, 3rd Generation Partnership Project, Valbonne, France (Apr. 15, 2016).
"PUSCH resource allocation in LAA," 3GPP TSG RAN WG1 Meeting #84bis, Busan, Korea, R1-162465, total 5 pages, 3rd Generation Partnership Project, Valbonne, France (Apr. 15, 2016).
"Discussion on PUSCH design for eLAA UL," 3GPP TSG RAN WG1 Meeting #84bis, R1-162799, total 4 pages, 3rd Generation Partnership Project, Valbonne, France (Apr. 15, 2016).
IN/201927031867, Examination Report, dated Mar. 15, 2021.

* cited by examiner

| 1 | 2 | 3 | 4 | 5 | 6 | 8 | 9 | 10 | 12 | 15 | 16 |
| 18 | 20 | 24 | 25 | 27 | 30 | 32 | 36 | 40 | 45 | 48 | 50 |
| 54 | 60 | 64 | 72 | 75 | 80 | 81 | 90 | 96 | 100 | | |

RESOURCE ALLOCATION METHOD AND RELATED DEVICE AND SYSTEM

CROSS-REFERENCE TO RELATED APPLICATIONS

This application is a continuation of International Application No. PCT/CN2018/074220, filed on Jan. 26, 2018, which claims priority to Chinese Patent Application No. 201710062965.7, filed on Jan. 26, 2017 and Chinese Patent Application No. 201710434527.9, filed on Jun. 9, 2017, all of which are hereby by reference in their entireties.

TECHNICAL FIELD

Embodiments of this application relate to the field of wireless communications technologies, and in particular, to a resource allocation method and a related device and system.

BACKGROUND

Rapid development of wireless communications technologies is draining up spectrum resources, driving explorations on unlicensed frequency bands. However, there are many regulatory restrictions on use of the unlicensed frequency bands. On the one hand, there are restrictions on an occupancy channel bandwidth (OCB) of signals on the unlicensed frequency bands. As stipulated by the European Telecommunications Standards Institute (ETSI), for the 2.4 GHz and 5 GHz frequency bands, a signal transmission bandwidth needs to occupy more than 80% of a system bandwidth, and for the 60 GHz frequency band, a signal transmission bandwidth needs to occupy more than 70% of a system bandwidth. On the other hand, there are restrictions on transmit power of signals on the unlicensed frequency bands. For example, ETSI requires that a maximum power spectrum density of signals is 10 dBm/MHz on 5150-5350 MHz frequency band.

For downlink transmission, a base station can use spectrum resources efficiently to comply with the ETSI regulation. However, for uplink transmission, the foregoing stipulated restrictions undoubtedly bring a big challenge to allocation of uplink resources.

In LTE Release 13, an enhanced licensed-assisted access (eLAA) technology is introduced into uplink transmission. To efficiently use unlicensed frequency bands while complying with the OCB regulation of ETSI, a resource interlace structure is used in eLAA. One resource interlace includes an integer quantity of resource blocks that are evenly distributed in the system bandwidth. Uplink resources are allocated by using a resource interlace as a basic unit, and resources allocated to each terminal are at least one resource interlace. As shown in FIG. 1, it is assumed that a system bandwidth is 20 MHz, corresponding to 100 RBs (an RB0 to an RB99), each resource interlace consists of 10 resource blocks (RB) that are evenly distributed in the entire bandwidth, and there are 10 RBs between every two adjacent RBs in each resource interlace. This ensures that each interlace has a frequency spacing (bandwidth spacing between RBs on two ends) of 91 RBs, approximately 16.38 MHz, which is greater than 80% of the 20 MHz system bandwidth.

However, the prior-art resource interlace structure includes constantly 10 RBs, but is not flexible enough. In some application scenarios, when a quantity of RBs that need to be allocated to a terminal is not an integer multiple of 10, resources are wasted. Especially, next-generation new radio (NR) technologies support flexible configuration of a plurality of system bandwidths and subcarrier spacings, and a total quantity of RBs corresponding to a system bandwidth may no longer be an integer multiple of 10. The prior-art resource interlace solution is unable to implement flexible scheduling of resources.

SUMMARY

In view that the prior-art resource interlace solution is unable to implement flexible scheduling of resources, to resolve this problem, embodiments of this application provide a resource allocation method and a related device and system, so that resources can be scheduled flexibly, to better adapt to multi-bandwidth scenarios supported by next-generation new radio technologies.

According to a first aspect, a resource allocation method is provided, including: allocating, by a base station, a resource group including M (where M≥2, and M is a positive integer) first resource blocks to a terminal when allocating uplink resources, where an occupancy ratio of a frequency spacing formed by the M first resource blocks to a system bandwidth is greater than a preset threshold. The resource group further includes N (where N≥1, and N is a positive integer) second resource blocks in any frequency domain positions. After allocating the resource group to the terminal, the base station may send resource indication information to the terminal. The resource indication information is used to indicate the resource group allocated to the terminal, and the resource indication information includes information about the resource group. It may be understood that to avoid resource collision, the N second resource blocks allocated to the terminal are distributed in any frequency domain positions other than positions of the M first resource blocks.

The OCB regulation of ETSI may be consulted for selection of the preset threshold herein, so that the OCB requirement of ETSI is met. For example, for the 2.4 GHz frequency band and the 5 GHz frequency band, ETSI requires that a signal transmission bandwidth should occupy more than 80% of a system bandwidth. Therefore, the preset threshold may be set to greater than or equal to 80%. This example is used to merely explain this embodiment of this application without constituting any limitation.

By practicing the method described in the first aspect, scheduling of uplink resources can be more flexible while the OCB requirement of ETSI is met.

With reference to the first aspect, in a first embodiment of this application, the M first resource blocks allocated to the terminal may be one or more pairs of resource blocks from a first resource set, and an occupancy ratio of a frequency spacing between every pair of resource blocks in the first resource set to the system bandwidth is greater than the preset threshold. Specifically, the occupancy ratio of the frequency spacing between every pair of resource blocks in the first resource set to the system bandwidth is greater than the preset threshold, so that the OCB requirement of ETSI is met.

It may be understood that a plurality of pairs of resource blocks in the first resource set may be allocated in a form of pairs to a plurality of terminals that need to transmit uplink data on an unlicensed frequency band, so that a signal transmission bandwidth of every terminal meets the basic OCB requirement. Furthermore, the rest N second resource blocks allocated to the terminal may be distributed in any frequency domain positions. This can maximize flexibility of resource allocation while ensuring that the basic OCB requirement is met.

To regularly index each pair of resource blocks in the first resource set, the first resource set may be implemented in the following several manners without being limited thereto:

In a first implementation, a same frequency spacing is present between every pair of resource blocks in the first resource set, and the occupancy ratio of the frequency spacing between every pair of resource blocks to the system bandwidth is greater than the preset threshold.

In a second implementation, frequency spacings of the pairs of resource blocks in the first resource set are in descending order, and an occupancy ratio of a smallest frequency spacing to the system bandwidth is greater than the preset threshold.

It should be noted that the first resource set may be alternatively presented in other forms without being limited to the foregoing two implementations, provided that the occupancy ratio of every pair of resource blocks in the first resource set to the system bandwidth is greater than the preset threshold.

In the foregoing first embodiment, to improve resource utilization, an occupancy ratio of a frequency spacing formed by the N second resource blocks to the system bandwidth may be less than the preset threshold. This means that the N second resource blocks may be distributed in intermediate frequency domain positions in the system bandwidth. It may be understood that there are only a limited quantity of resource blocks on two ends of the system bandwidth that can meet the OCB requirement. Therefore, this scheduling manner of distributing the N second resource blocks in the intermediate frequency domain positions can help the base station to allocate the limited resource blocks on the two ends to more terminals that need to transmit uplink data on an unlicensed frequency band.

Optionally, an occupancy ratio of a frequency spacing formed by the N second resource blocks to the system bandwidth may be greater than the preset threshold. This means that at least two of the N second resource blocks are distributed on two ends of the system bandwidth.

In the foregoing first embodiment, the resource indication information may be implemented in the following several manners without being limited thereto:

In a first implementation, the resource indication information may include indexes of the one or more pairs of resource blocks that are allocated to the terminal, in the first resource set. For example, assuming that a 1st pair of resource blocks in the first resource set shown in FIG. 7 are allocated to the terminal, the resource indication information sent to the terminal may include an index "1" of the 1st pair of resource blocks. This example is used to merely explain this embodiment of this application without constituting any limitation.

If the N second resource blocks allocated to the terminal are also one or more pairs of resource blocks in the first resource set, the resource indication information further includes indexes of the one or more pairs of resource blocks corresponding to the N second resource blocks, in the first resource set. If the N second resource blocks allocated to the terminal are not resource blocks in the first resource set, the resource indication information further includes resource block numbers of the N second resource blocks.

In a second implementation, the resource indication information may include resource block numbers of the M first resource blocks allocated to the terminal and resource block numbers of the N second resource blocks allocated to the terminal.

Specifically, resource blocks in the entire system bandwidth may be numbered, and a specific resource block can be indicated by using a resource block number. The resource block number herein may also be referred to as a resource block index.

In the foregoing first embodiment, when sending the resource indication information, the base station may add the resource indication information to downlink control information (DCI). For example, the base station may add the resource indication information to an uplink grant (UL grant) returned to the terminal. The UL grant herein is a type of DCI in a DCI format 0, 0A, 0B, 4, 4A, or 4B.

It should be noted that the base station may alternatively add the resource indication information to other response messages for a scheduling request, or the base station may alternatively encapsulate the resource indication information into a separate message, and return the message to the terminal. This embodiment of this application imposes no limitation on how the resource indication information is sent.

With reference to the first aspect, in a second embodiment of this application, the M first resource blocks may form K (K≥1, where K is a positive integer) resource interlace(s), and an occupancy ratio of a frequency spacing formed by the K resource interlace(s) to the system bandwidth is greater than the preset threshold. The N second resource blocks may be some of resource blocks in a resource interlace, and the resource interlace to which the N second resource blocks belong is allocated to a plurality of terminals. It should be noted that the N second resource blocks may be from one resource interlace or from a plurality of resource interlace(s).

It may be understood that the M first resource blocks allocated to the terminal form the K resource interlace(s), the occupancy ratio of the frequency spacing formed by the K resource interlace(s) to the system bandwidth is greater than the preset threshold, the rest N second resource blocks allocated to the terminal are some of resource blocks in the resource interlace, and the resource interlace to which the N second resource blocks belong is split into a plurality of parts that are shared by the plurality of terminals. In this way, resource scheduling can be more flexible and resource utilization can be improved while the OCB requirement of ETSI is met.

In the foregoing first embodiment, the resource indication information may be implemented in the following several manners without being limited thereto:

In a first implementation, the resource indication information may include any one or more of the following: interlace indexes of the K resource interlace(s), an interlace index of the resource interlace to which the N second resource blocks belong, or resource block indexes of the N second resource blocks in the resource interlace to which the N second resource blocks belong.

Specifically, the base station may index, with numbers, resource interlace(s) included in the entire system bandwidth. Alternatively, the base station may index, with numbers, resource blocks included in each resource interlace. For example, 10 resource blocks included in each resource interlace are indexed with numbers 0 to 9.

In the foregoing first implementation, the resource indication information may further include attribute indication information corresponding to the resource interlace (which is a partial interlace) to which the N second resource blocks belong, to indicate that only some of resource blocks in the resource interlace to which the N second resource blocks belong are allocated to the terminal. The resource interlace to which the N second resource blocks belong is split into a plurality of parts, and the plurality of parts are shared by the plurality of terminals.

In a second implementation, the resource indication information may further include resource block numbers of the M first resource blocks allocated to the terminal and resource block numbers of the N second resource blocks allocated to the terminal.

Specifically, resource blocks in the entire system bandwidth may be numbered, and a specific resource block can be indicated by using a resource block number. The resource block number herein may also be referred to as a resource block index.

It should be noted that more resource indication manners may be agreed upon between the base station and the terminal, rather than being limited to the foregoing two implementations. For example, the resource indication information may include interlace indexes of the K resource interlace(s) and resource block numbers of the N second resource blocks. This example is merely an implementation of this embodiment of this application without constituting any limitation. In actual application, different implementations may be used.

In the foregoing second embodiment, when sending the resource indication information, the base station may add the resource indication information to downlink control information (DCI). For example, the base station may add the resource indication information to an uplink grant (UL grant) returned to the terminal. The UL grant herein is a type of DCI in a DCI format 0, 0A, 0B, 4, 4A, or 4B.

It should be noted that the base station may alternatively add the resource indication information to other response messages for the scheduling request, or the base station may alternatively encapsulate the resource indication information into a separate message, and return the message to the terminal. This embodiment of this application imposes no limitation on how the resource indication information is sent.

In some embodiments of this application, to adapt to scenarios with a plurality of system bandwidths and/or a plurality of subcarrier spacings, the K resource interlace(s) may include H resource blocks, where H is a positive integer, and H is divisible by a total quantity of resource blocks that correspond to each of a plurality of transmission bandwidths corresponding to an unlicensed frequency band.

Optionally, in scenarios with a plurality of system bandwidths and/or a plurality of subcarrier spacings supported in this embodiment of this application, a complete resource interlace allocated to the terminal may be indicated by using a resource indication value (RIV). It should be noted that this RIV indication manner may be mainly used to indicate complete resource interlace(s) allocated to the terminal. The resource indication manner described previously may be used as a supplement to indicate the rest N second resource blocks allocated to the terminal. Details are not described herein again.

According to a second aspect, a network device is provided, including a plurality of function modules, configured to correspondingly perform the method provided in any one of the first aspect or the possible implementations of the first aspect.

According to a third aspect, a network device is provided, configured to perform the resource allocation method described in the first aspect. The wireless network device may include a memory, a processor coupled to the memory, a transmitter, and a receiver. The transmitter is configured to send a mobile communication signal to another wireless network device, for example, a terminal. The receiver is configured to receive a mobile communication signal sent by the another wireless network device, for example, the terminal. The memory is configured to store code for implementing the resource allocation method described in the first aspect. The processor is configured to execute the program code stored in the memory, to perform the resource allocation method described in any one of the first aspect or the possible implementations of the first aspect.

According to a fourth aspect, a communications system is provided. The communications system includes a base station and a terminal.

The base station is configured to allocate a resource group including M (where M≥2, and M is a positive integer) first resource blocks to the terminal when allocating uplink resources, where an occupancy ratio of a frequency spacing formed by the M first resource blocks to a system bandwidth is greater than a preset threshold, and the resource group further includes N (where N≥1, and N is a positive integer) second resource blocks in any frequency domain positions. The base station is further configured to send resource indication information to the terminal, where the resource indication information is used to indicate the resource group allocated to the terminal and includes information about the resource group.

After receiving the resource indication information, the terminal may process a signal based on the resource indication information, for example, modulating to-be-transmitted uplink data onto resources indicated by the resource indication information, and processing frequency multiplexing and resource sharing for a transmit signal. The terminal is further configured to send, to the base station, processed uplink data on the resources indicated by the resource indication information.

With reference to the fourth aspect, in some optional embodiments, the base station may be the network device described in the second aspect or the third aspect. Alternatively, the base station may be the base station described in the first aspect.

According to a fifth aspect, a computer readable storage medium is provided. The readable storage medium stores program code for implementing the resource allocation method described in the first aspect, and the program code includes an executable instruction for running the resource allocation method described in the first aspect.

By practicing the embodiments of this application, scheduling of uplink resources can be more flexible for use of an unlicensed frequency band while the OCB requirement of ETSI is met. In addition, resource utilization can be improved.

DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Some terms used in embodiments of this application are used to merely explain the embodiments of this application, with no intention to limit this application.

For ease of understanding the embodiments of this application, a wireless communications system related to the embodiments of this application is first described.

Figure 1:
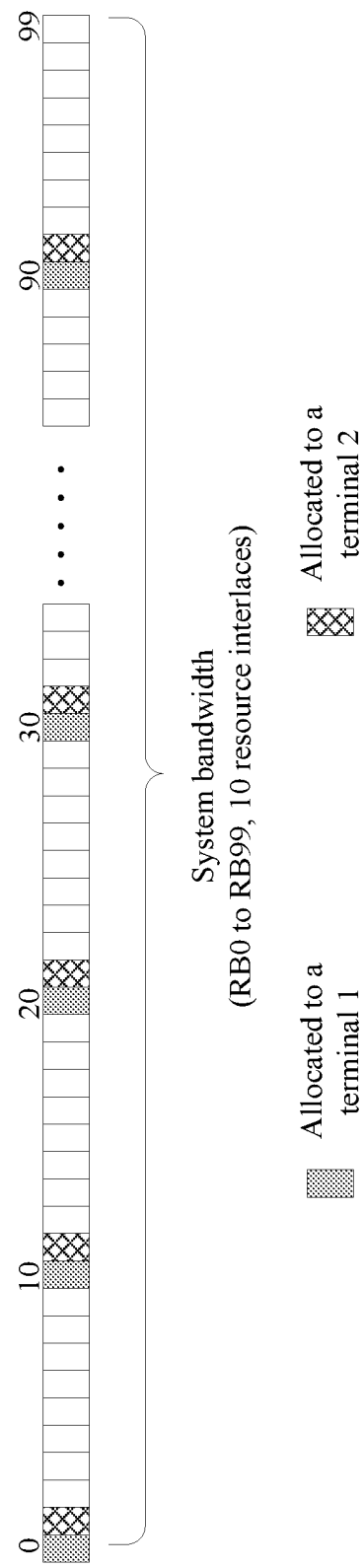
FIG. 1 is a schematic diagram of a prior-art resource allocation manner according to this application.
Figure 2:
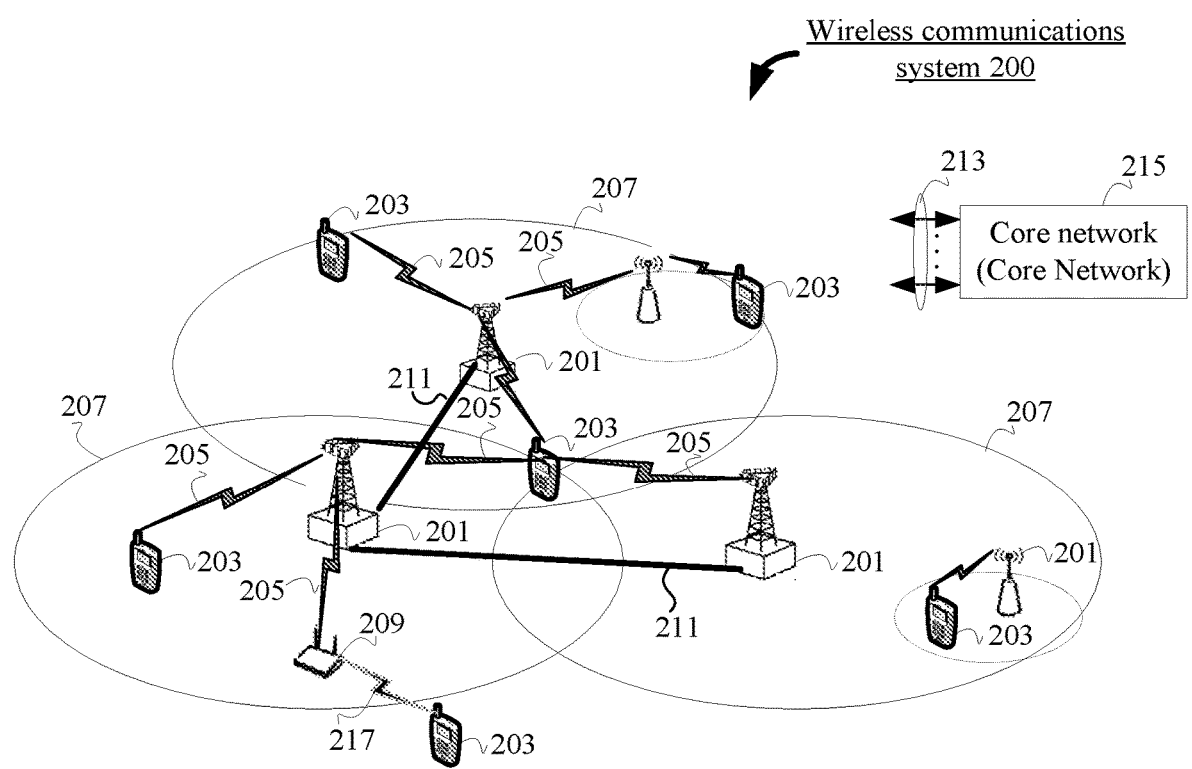
FIG. 2 is a schematic architectural diagram of a wireless communications system according to this application.

FIG. 2 shows a wireless communications system 200 according to this application. The wireless communications system 200 may work on a licensed frequency band or work on an unlicensed frequency band. It may be understood that use of the unlicensed frequency band can improve a capacity of the wireless communications system 200. As shown in FIG. 2, the wireless communications system 200 includes one or more base stations 201, for example, a NodeB, an eNodeB, or a WLAN access point, one or more terminals 203, and a core network 215.

The base station 201 may be configured to communicate with the terminal 203 under control of a base station controller (not shown). In some embodiments, the base station controller may be a part of the core network 215 or be integrated into the base station 201.

The base station 201 may be configured to transmit control information or user data to the core network 215 through a backhaul interface (for example, an Si interface) 213.

The base station 201 may wirelessly communicate with the terminal 203 by using one or more base station antennas. Each base station 201 may provide communication coverage for a coverage area 207 corresponding to the base station 201. The coverage area 207 corresponding to an access point may be divided into a plurality of sectors, and one sector corresponds to a part of the coverage area (not shown).

Two base stations 201 may communicate with each other through a backhaul link 211. The backhaul link 211 herein may be a wired communication connection or a wireless communication connection.

In some embodiments of this application, the base station 201 may include a base transceiver station, a radio transceiver, a basic service set (BSS), an extended service set (ESS), a NodeB, an eNodeB, or the like. The wireless communications system 200 may include several different types of base stations 201, for example, a macro base station, a micro base station, and the like. The base station 201 may apply different radio technologies, for example, a cell radio access technology or a WLAN radio access technology.

The terminals 203 may be distributed in the entire wireless communications system 200, and may be static or moving. In some embodiments of this application, the terminal 203 may include a mobile device, a mobile station, a mobile unit, a radio unit, a remote unit, a user agent, a mobile client, or the like.

In this embodiment of this application, the wireless communications system 200 may be an LTE communications system capable of working on an unlicensed frequency band, for example, an LTE-U system, or may be a 5G communications system, a future new radio communications system, or the like capable of working on an unlicensed frequency band. The wireless communications system 200 may use a licensed-assisted access (LAA) scheme to process terminal access on the unlicensed frequency band. In the LAA scheme, a primary cell works on a licensed frequency band to transfer key messages and services requiring assured quality of service, and a secondary cell works on an unlicensed frequency band to improve data plane performance.

In this embodiment of this application, the wireless communications system 200 can support multi-carrier (waveform signals of different frequencies) operations. A multi-carrier transmitter can transmit modulated signals simultaneously on a plurality of carriers. For example, every communication connection 205 may carry multi-carrier signals modulated by using different radio technologies. Every modulated signal may be sent on different carriers, and may carry control information (for example, a reference signal and a control channel), overhead information, data, and the like.

In addition, the wireless communications system 200 may further include a Wi-Fi network. To enable harmonious coexistence of an operator network and a Wi-Fi network (working on an unlicensed spectrum), the wireless communications system 200 may use a listen before talk (LBT) mechanism. For example, in the wireless communications system 200, some terminals 203 may be connected to a Wi-Fi access point 209 through Wi-Fi communication connections 217, to use unlicensed spectrum resources, and some terminals 203 may be connected to the base station 201 through mobile communication connections 205, to use unlicensed spectrum resources. Before using an unlicensed frequency band, any device needs to perform listening, to detect whether the frequency band has been occupied, and cannot occupy the frequency band to transmit data unless the frequency band is not busy.

Figure 3:
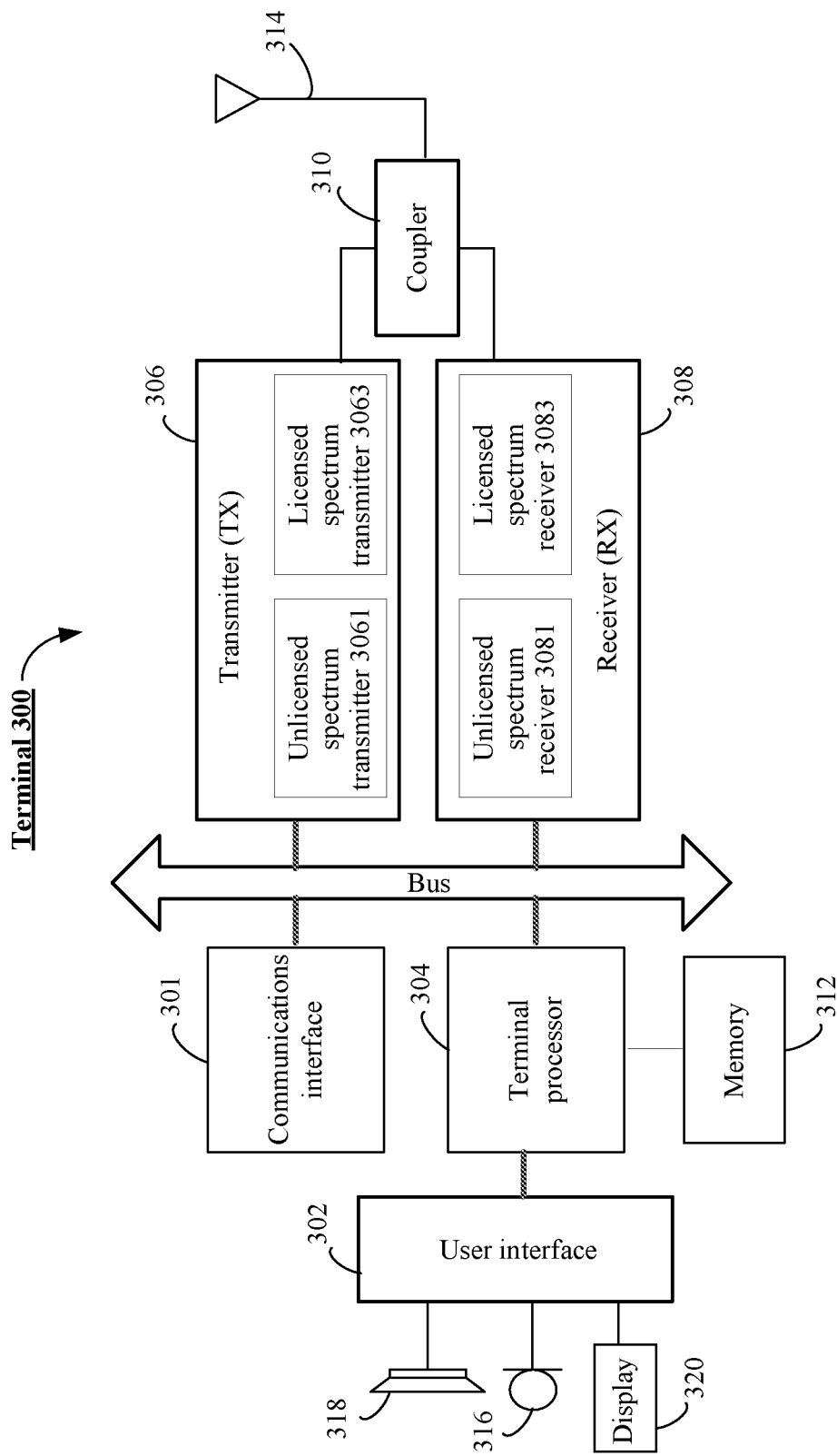
FIG. 3 is a schematic diagram of a hardware architecture of a terminal according to an embodiment of this application.

FIG. 3 shows a terminal 300 according to some embodiments of this application. As shown in FIG. 3, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected by a bus or in other manners. In FIG. 3, an example is used in which a bus is used for connection.

A communications interface 301 may be configured for the terminal 300 to communicate with another communications device, for example, a base station. Specifically, the base station may be a base station 400 shown in FIG. 4. Specifically, the communications interface 301 may include one or more of a global system for mobile communications (GSM) (2G) communications interface, a wideband code division multiple access (WCDMA) (3G) communications interface, or a long term evolution (LTE) (4G) communications interface, or the like, or may be a communications interface of 4.5G, 5G, or future new radio. Without being limited to a wireless communications interface, the terminal 300 may be further equipped with a wired communications interface 301, for example, a local access network (LAN) interface.

The antenna 314 may be configured to: convert electromagnetic energy in a transmission line into an electromagnetic wave in free space, or convert an electromagnetic wave in free space into electromagnetic energy in a transmission line. The coupler 310 is configured to: split a mobile communication signal received by the antenna 314 into a plurality of paths, and distribute them to a plurality of receivers 308.

The transmitter 306 may be configured to perform transmit processing on a signal output by the terminal processor 304, for example, modulating the signal onto a licensed frequency band, or modulating the signal onto an unlicensed frequency band. In some embodiments of this application, the transmitter 306 may include an unlicensed spectrum transmitter 3061 and a licensed spectrum transmitter 3063. The unlicensed spectrum transmitter 3061 may support the terminal 300 in transmitting signals on one or more unlicensed spectrums, and the licensed spectrum transmitter 3063 may support the terminal 300 in transmitting signals on one or more licensed spectrums.

The receiver 308 may be configured to perform receiving processing on the mobile communication signal received by the antenna 314. For example, the receiver 308 may demodulate a received signal that has been modulated onto an unlicensed frequency band, or demodulate a received signal that has been modulated onto a licensed frequency band. In some embodiments of this application, the receiver 308 may include an unlicensed spectrum receiver 3081 and a licensed spectrum receiver 3083. The unlicensed spectrum receiver 3081 may support the terminal 300 in receiving a signal that is modulated onto an unlicensed spectrum, and the licensed spectrum receiver 3083 may support the terminal 300 in receiving a signal that is modulated onto a licensed spectrum.

In some embodiments of this application, the transmitter 306 and the receiver 308 may be considered as a wireless modem. In the terminal 300, there may be one or more transmitters 306 and one or more receivers 308.

In addition to the transmitter 306 and the receiver 308 shown in FIG. 3, the terminal 300 may further include other communications components, for example, a GPS module, a Bluetooth module, and a wireless fidelity (Wi-Fi) module. In addition to the foregoing wireless communication signals, the terminal 300 may further support other wireless communication signals, for example, satellite signals and shortwave signals. Without being limited to wireless communications, the terminal 300 may be further equipped with a wired network interface (for example, a LAN interface) to support wired communications.

The input/output modules may be configured to implement interaction between the terminal 300 and a user or an external environment, and may mainly include the audio input/output module 318, the key input module 316, the display 320, and the like. Specifically, the input/output modules may further include a camera, a touchscreen, a sensor, and the like. The input/output modules all communicate with the terminal processor 304 through the user interface 302.

The memory 312 is coupled to the terminal processor 304, and configured to store various software programs and/or a plurality of sets of instructions. Specifically, the memory 312 may include a high-speed random access memory, and may also include a non-volatile memory, for example, one or more magnetic disk storage devices, flash memory devices, or other non-volatile solid-state storage devices. The memory 312 may store an operating system (referred to briefly as a system below), for example, an embedded operating system such as ANDROID, IOS, WINDOWS, or LINUX. The memory 312 may further store a network communication program. The network communication program may be used to communicate with one or more peripheral devices, one or more terminal devices, or one or more network devices. The memory 312 may further store a user interface program. The user interface program may use a graphical operation interface to intuitively display content of an application program, and use input controls such as menus, dialog boxes, and keys to receive control operations of a user on an application program.

In some embodiments of this application, the memory 312 may be configured to store a program for the terminal 300 side to implement a resource allocation method provided in one or more embodiments of this application. For implementation of the resource allocation method provided in the one or more embodiments of this application, refer to subsequent embodiments.

The terminal processor 304 may be configured to read and execute a computer readable instruction. Specifically, the terminal processor 304 may be configured to: invoke the program stored in the memory 312, for example, the program for the terminal 300 side to implement the resource allocation method provided in the one or more embodiments of this application, and execute an instruction included in the program.

It may be understood that the terminal 300 may be the terminal 203 in the wireless communications system 200 shown in FIG. 2, and may be implemented as a mobile device, a mobile station, a mobile unit, a radio unit, a remote unit, a user agent, a mobile client, or the like.

It should be noted that the terminal 300 shown in FIG. 3 is merely an implementation of the embodiments of this application. In actual application, the terminal 300 may alternatively include more or fewer components. This is not limited herein.

Figure 4:
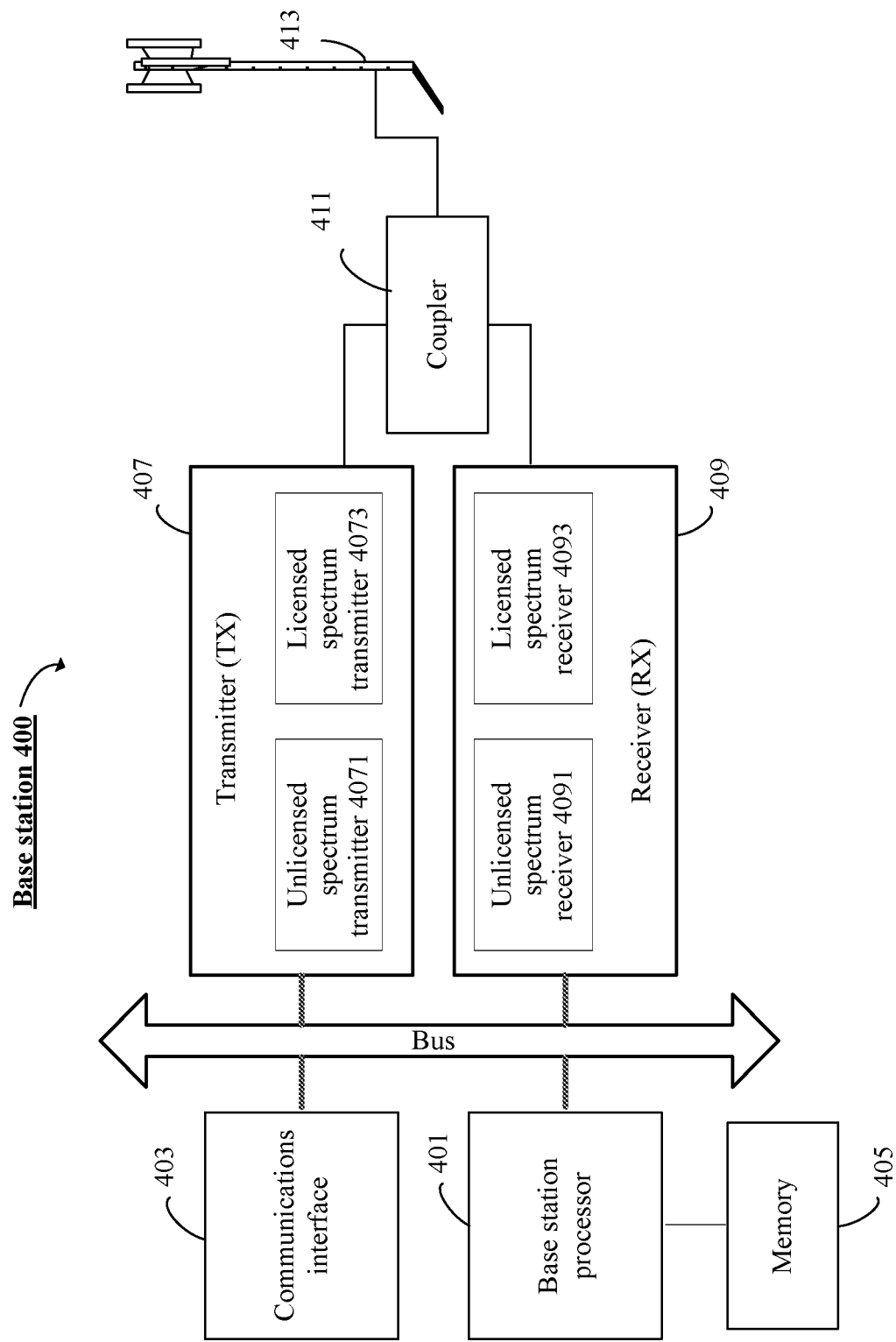
FIG. 4 is a schematic diagram of a hardware architecture of a base station according to an embodiment of this application.

FIG. 4 shows a base station 400 according to some embodiments of this application. As shown in FIG. 4, the base station 400 may include a communications interface 403, one or more base station processors 401, a transmitter 407, a receiver 409, a coupler 411, an antenna 413, and a memory 405. These components may be connected by a bus or in other manners. In FIG. 4, an example is used in which a bus is used for connection.

The communications interface 403 may be configured for the base station 400 to communicate with another communications device, for example, a terminal device or another base station. Specifically, the terminal device may be the terminal 300 shown in FIG. 3. Specifically, the communications interface 403 may include one or more of a global system for mobile communications (GSM) (2G) communications interface, a wideband code division multiple access (WCDMA) (3G) communications interface, a long term evolution (LTE) (4G) communications interface, or the like, or may be a communications interface of 4.5G, 5G, or future new radio. Without being limited to a wireless communications interface, the base station 400 may be further equipped with a wired communications interface 403 to support wired communications. For example, a backhaul link between a base station 400 and another base station 400 may be a wired communication connection.

The antenna 413 may be configured to: convert electromagnetic energy in a transmission line into an electromagnetic wave in free space, or convert an electromagnetic wave in free space into electromagnetic energy in a transmission line. The coupler 411 may be configured to: split a mobile communication signal into a plurality of paths, and distribute them to a plurality of receivers 409.

The transmitter 407 may be configured to perform transmit processing on a signal output by the base station processor 401, for example, modulating the signal onto a licensed frequency band, or modulating the signal onto an unlicensed frequency band. In some embodiments of this application, the transmitter 407 may include an unlicensed spectrum transmitter 4071 and a licensed spectrum transmitter 4073. The unlicensed spectrum transmitter 4071 may support the base station 400 in transmitting signals on one or more unlicensed spectrums, and the licensed spectrum transmitter 4073 may support the base station 400 in transmitting signals on one or more licensed spectrums.

The receiver 409 may be configured to receive the mobile communication signal received by the antenna 413. For example, the receiver 409 may demodulate a received signal that has been modulated onto an unlicensed frequency band, or demodulate a received signal that has been modulated onto a licensed frequency band. In some embodiments of this application, the receiver 409 may include an unlicensed spectrum receiver 4091 and a licensed spectrum receiver 4093. The unlicensed spectrum receiver 4091 may support the base station 400 in receiving a signal that is modulated onto an unlicensed spectrum, and the licensed spectrum receiver 4093 may support the base station 400 in receiving a signal that is modulated onto a licensed spectrum.

In some embodiments of this application, the transmitter 407 and the receiver 409 may be considered as a wireless modem. In the base station 400, there may be one or more transmitters 407 and one or more receivers 409.

The memory 405 is coupled to the base station processor 401, and configured to store various software programs and/or a plurality of sets of instructions. Specifically, the memory 405 may include a high-speed random access memory, and may also include a non-volatile memory, for example, one or more magnetic disk storage devices, flash memory devices, or other non-volatile solid-state storage devices. The memory 405 may store an operating system (referred to briefly as a system below), for example, an embedded operating system such as uCOS, VxWorks, or RTLinux. The memory 405 may further store a network communication program. The network communication program may be used to communicate with one or more peripheral devices, one or more terminal devices, or one or more network devices.

The base station processor 401 may be configured to manage radio channels, establish or tear down a call or communications link, and control cross-region handover of user equipment in a local control region. Specifically, the base station processor 401 may include an administration module/communication module (AM/CM) (a center for line switching and information exchange), a basic module (BM) (configured to complete functions of call processing, signaling processing, radio resource management, radio link management, and circuit maintenance), a transcoder and submultiplexer (TCSM) (configured to complete functions of multiplexing, demultiplexing, and transcoding), and the like.

In this embodiment of this application, the base station processor 401 may be configured to read and execute a computer readable instruction. Specifically, the base station processor 401 may be configured to: invoke a program stored in the memory 405, for example, a program for the base station 400 side to implement a resource allocation method provided in one or more embodiments of this application, and execute an instruction included in the program.

It may be understood that the base station 400 may be the base station 201 in the wireless communications system 200 shown in FIG. 2, and may be implemented as a base transceiver station, a wireless transceiver, a basic service set (BSS), an extended service set (ESS), a NodeB, an eNodeB, or the like. The base station 400 may be implemented as several different types of base stations, for example, a macro base station or a micro base station. The base station 400 may apply different radio technologies, for example, a cell radio access technology or a WLAN radio access technology.

It should be noted that the base station 400 shown in FIG. 4 is merely an implementation of the embodiments of this application. In actual application, the base station 400 may alternatively include more or fewer components. This is not limited herein.

Based on the foregoing embodiments corresponding to the wireless communications system 200, the terminal 300, and the base station 400, an embodiment of this application provides a resource allocation method to implement flexible scheduling of resources in allocation of uplink resources while ensuring that the OCB requirement of ETSI is met.

A main principle of this application may include that resources allocated by a base station to a terminal in allocation of uplink resources can be split into two parts. One part of resources may form a frequency spacing whose occupancy ratio to an entire system bandwidth is greater than a preset threshold, and the other part of resources may be flexibly distributed in any positions in the system bandwidth. This can not only ensure a significant frequency spacing, but also make allocation of uplink resources more flexible. The OCB regulation of ETSI may be consulted for selection of the preset threshold herein, so that the OCB requirement of ETSI is met. For example, for the 2.4 GHz frequency band and the 5 GHz frequency band, ETSI requires that a signal transmission bandwidth should occupy more than 80% of a system bandwidth. Therefore, the preset threshold may be set to greater than or equal to 80%.

It should be noted that this example is used to merely explain this embodiment of this application without constituting any limitation. This embodiment of this application is also applicable to future scenarios and other scenarios in which a regulation or requirement is present for an occupancy ratio of a signal transmission bandwidth to a system bandwidth, without being limited to the OCB regulation of ETSI.

To simplify the descriptions below, first, it is assumed that the one part of resources include M resource blocks (RB), and that the other part of resources include N resource blocks (RB), where $M \geq 2$, $N \geq 1$, and both M and N are positive integers. In this embodiment of this application, the M resource blocks may be used to ensure that the signal transmission bandwidth meets the OCB requirement, and these resource blocks are referred to as first resource blocks. With the signal transmission bandwidth meeting the OCB requirement, the N resource blocks are used for flexible use of the signal transmission bandwidth, and these resource blocks are referred to as second resource blocks. Regarding selection of values of M and N, it may be understood that because the signal transmission bandwidth needs to form a frequency spacing within the system bandwidth, resources allocated to signal include at least two first resource blocks, for example, at least one pair of resource blocks or at least one interlace, and a larger spacing between the two first resource blocks in frequency domain entails a larger signal transmission bandwidth.

Figure 5:
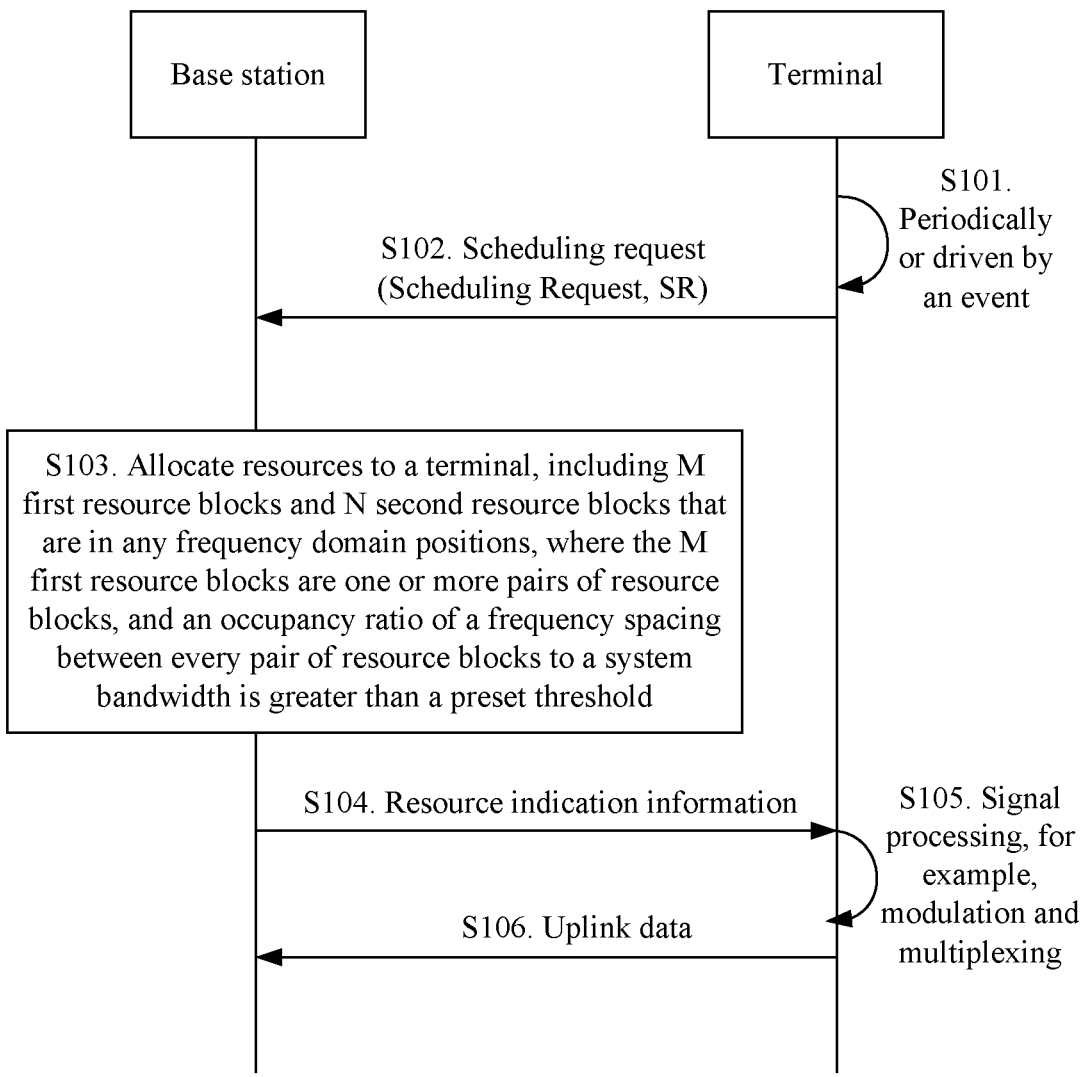
FIG. 5 is a schematic flowchart of a resource allocation method according to an embodiment of this application.

FIG. 5 shows a resource allocation method according to an embodiment of this application. In the embodiment in FIG. 5, the M first resource blocks allocated to the terminal are one or more pairs of resource blocks in a first resource set. An occupancy ratio of a frequency spacing between every pair of resource blocks in the first resource set to the system bandwidth is greater than the preset threshold. Frequency domain positions of the rest N second resource blocks allocated to the terminal are not limited, provided that these positions do not collide with those of the M first resource blocks. As shown in FIG. 5, the method may include the following steps.

S102. A base station receives a scheduling request (SR) sent by a terminal. The scheduling request is used to request the base station to allocate uplink transmission resources.

Referring to step S101 in FIG. 5, the terminal may send the scheduling request to the base station periodically. For example, the terminal sends the scheduling request to the base station once every transmission time interval (TTI). Alternatively, the terminal may send the scheduling request to the base station when driven by an event. For example, when there is uplink data to be transmitted, the terminal sends the scheduling request to the base station. Arrival of the uplink data herein is an event driving the terminal to send the scheduling request. This embodiment of this application imposes no limitation on a mechanism for triggering the terminal to send the scheduling request.

S103. In response to the scheduling request, the base station allocates resources to the terminal, the resources including M first resource blocks and N second resource blocks that are in any frequency domain positions, where the M first resource blocks are one or more pairs of resource blocks in a first resource set, and an occupancy ratio of a frequency spacing between every pair of resource blocks in the first resource set to a system bandwidth is greater than a preset threshold. To avoid resource collision, the N second resource blocks allocated to the terminal are distributed in any frequency domain positions other than positions of the M first resource blocks.

Specifically, resource blocks in the first resource set may be split into two parts, and the two parts are distributed on or near two ends of the system bandwidth, respectively. Two resource blocks included in each pair of resource blocks in the first resource set are from the two parts, respectively, so that the occupancy ratio of the frequency spacing between every pair of resource blocks to the system bandwidth is greater than the preset threshold, meeting the OCB requirement of ETSI.

Figure 6:
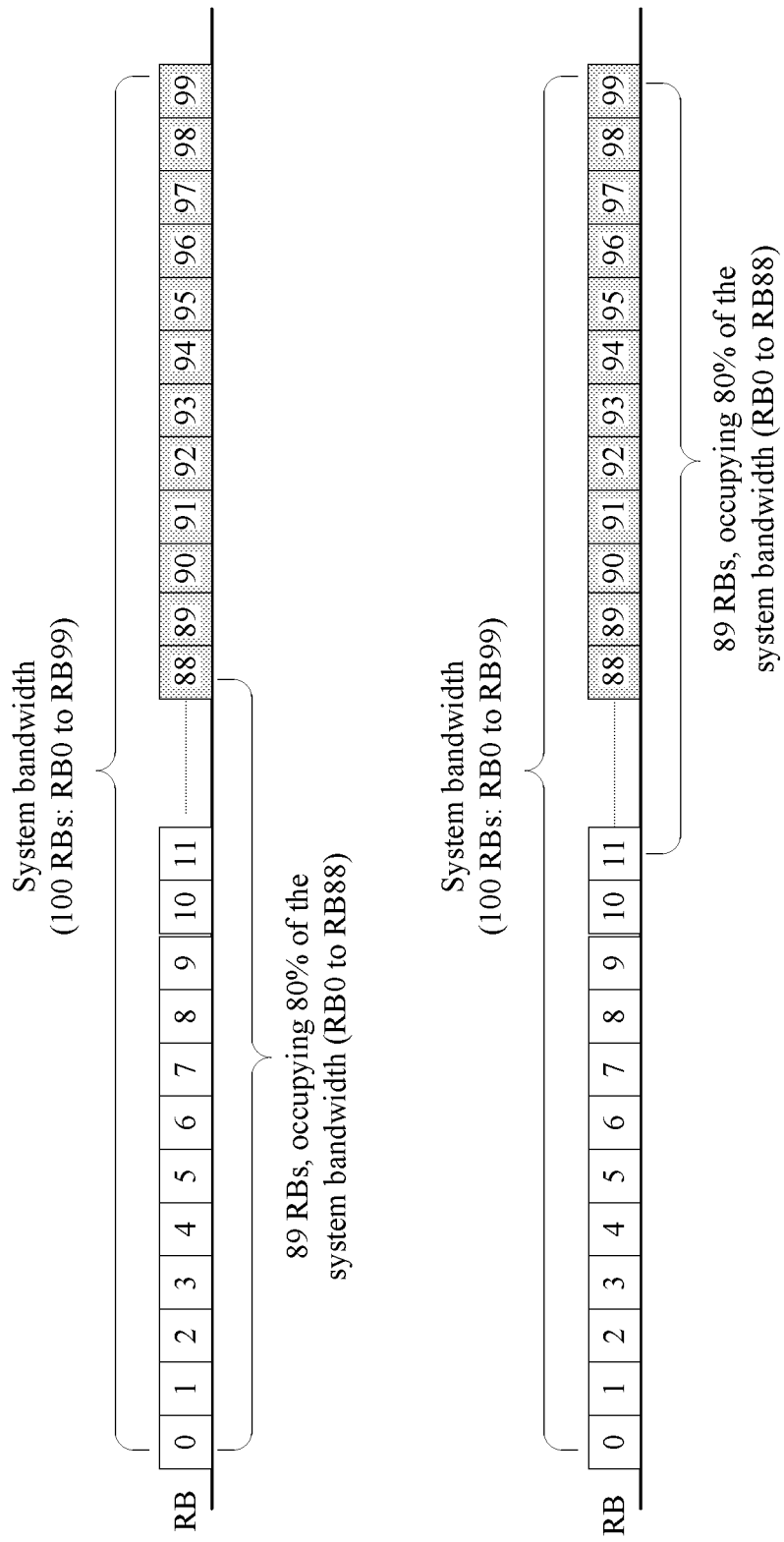
FIG. 6 is a schematic diagram of resources in a system bandwidth scenario according to this application.

Referring to FIG. 6, a 20 MHz system bandwidth and a 15 kHz subcarrier spacing supported by the 5 GHz frequency band (an unlicensed frequency band) are used as an example. For the 20 MHz system bandwidth, excluding guard bands (approximately 10% of the system bandwidth), there are 100 RBs remaining to serve as a system transmission bandwidth, and each RB includes 12 consecutive subcarriers (180 kHz) in frequency domain. In this case, to meet the OCB requirement, it is required that a signal transmission bandwidth occupy more than 80% of the system bandwidth and include at least 89 RBs (89×180 kHz=16.02 MHz).

As shown in FIG. 6, a pair of resource blocks including RB0 and RB88 ensures a signal transmission bandwidth that meets the minimum OCB requirement, and frequency spacings corresponding to other RB pairs (for example, a pair of RB89 and RB90) after the pair of RB0 and RB88 are even larger. Apparently, the OCB requirement is also met. A pair of resource blocks including RB99 and RB11 also ensures a signal transmission bandwidth that meets the minimum OCB requirement, and frequency spacings corresponding to other RB pairs (for example, a pair of RB10 and RB9) before the pair of RB99 and RB11 are even larger. Apparently, the OCB requirement is also met.

In general, in the embodiment shown in FIG. 6, in two resource blocks included in each pair of resource blocks in the first resource set, one resource block may come from one end of the system bandwidth, that is, RB0 to RB11, and the other resource block may come from the other end of the system bandwidth, that is, RB88 to RB99. For example, the base station may randomly select one resource block from one end of the system bandwidth, and randomly select one resource block from the other end of the system bandwidth, so that an occupancy ratio of a frequency spacing between the selected two resource blocks to the system bandwidth is greater than the preset threshold, meeting the OCB requirement. For example, a frequency spacing between RB0 and RB89 is 16.20 MHz, whose occupancy ratio to the system bandwidth is greater than 80%. This example is used to merely explain this embodiment of this application without constituting any limitation.

For ease of regularly indexing each pair of resource blocks in the first resource set, the following describes two implementations of the first resource set.

In a first implementation, a same frequency spacing is present between every pair of resource blocks in the first resource set, and the occupancy ratio of the frequency spacing between every pair of resource blocks to the system bandwidth is greater than the preset threshold.

Figure 7:
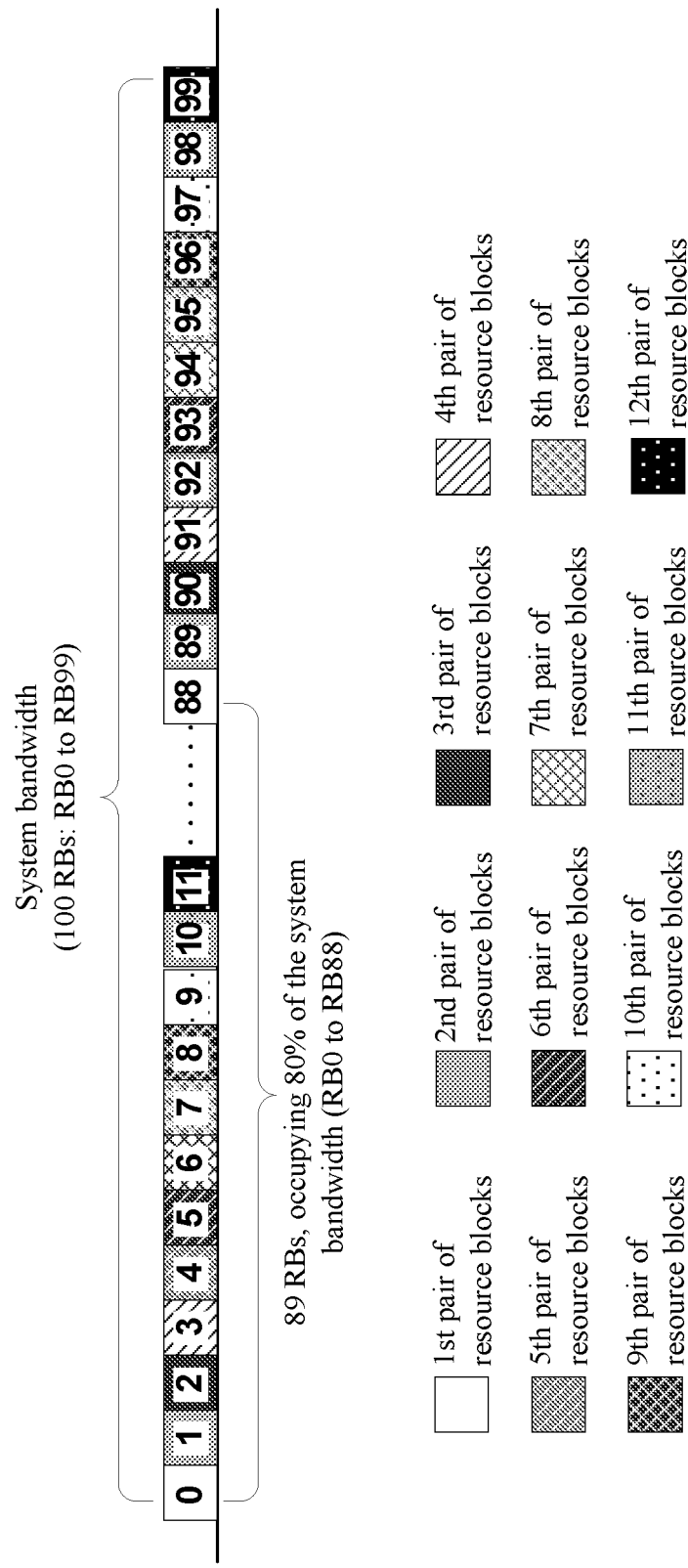
FIG. 7 is a schematic diagram of resources in a first resource set (including 12 pairs of resource blocks) according to an embodiment of this application.

As shown in FIG. 7, the first resource set includes 12 pairs of resource blocks. RB0 and RB88 form a 1st pair of resource blocks, RB1 and RB89 form a 2nd pair of resource blocks, RB2 and RB90 form a 3rd pair of resource blocks, RB3 and RB91 form a 4th pair of resource blocks, and so on. A frequency spacing between every pair of resource blocks is 16.02 MHz, whose occupancy ratio to the system bandwidth is slightly greater than 80%, meeting the OCB requirement.

It may be understood that the 12 pairs of resource blocks in the first resource set shown in FIG. 7 may be allocated in a form of pairs to a plurality of terminals that need to transmit uplink data on an unlicensed frequency band. Optionally, the base station may process the rest 76 resource blocks (RB12 to RB87) other than the 12 pairs of resource blocks in a prior-art resource scheduling manner (for example, an uplink resource scheduling manner in LTE). This can maximize flexibility of resource allocation and improve resource utilization while ensuring that the basic OCB requirement is met.

Figure 8:
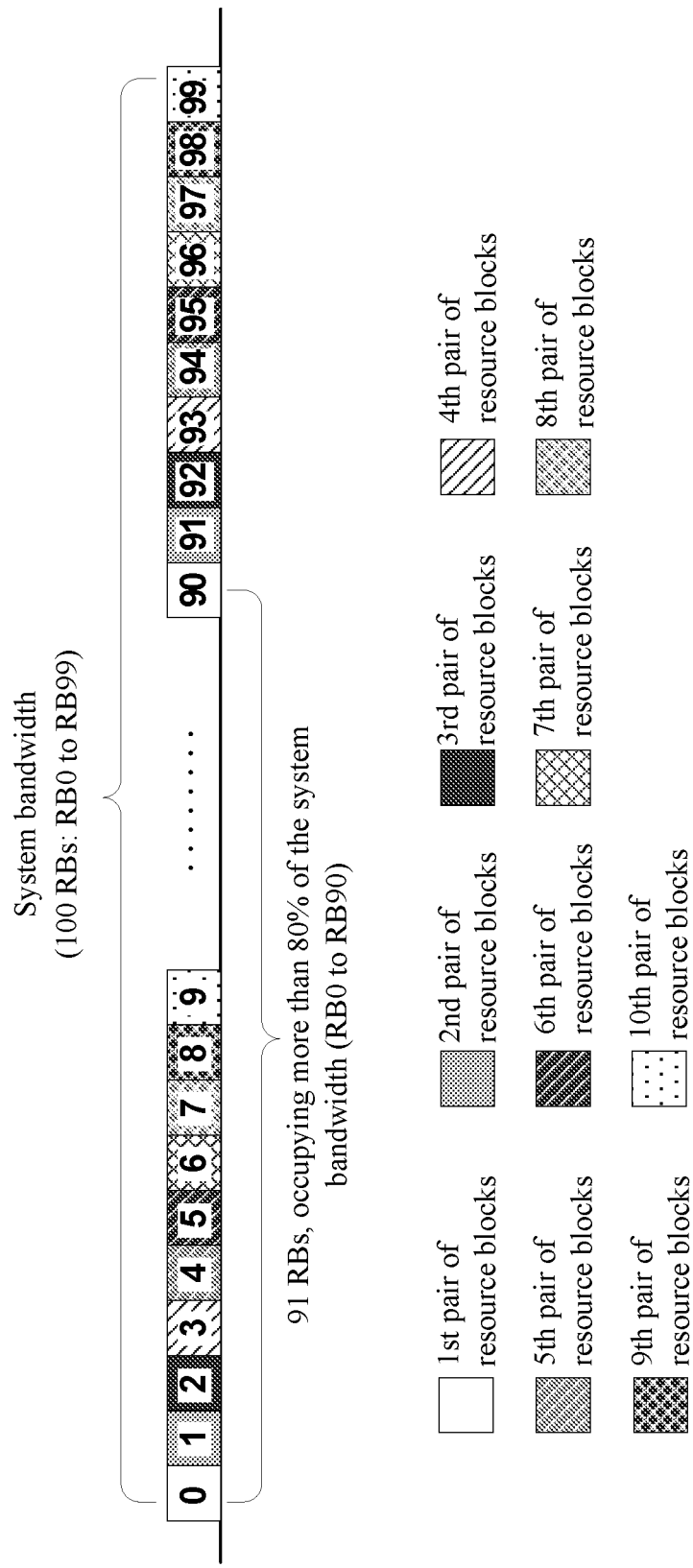
FIG. 8 is a schematic diagram of resources in a first resource set (including 10 pairs of resource blocks) according to another embodiment of this application.

It should be noted that FIG. 7 is merely an embodiment of the first resource set. In some optional embodiments, a frequency spacing between a pair of resource blocks may be larger, without being limited to 16.02 MHz. For example, as shown in FIG. 8, the first resource set includes 10 pairs of resource blocks. RB0 and RB90 form a 1st pair of resource blocks, RB1 and RB91 form a 2nd pair of resource blocks, RB2 and RB92 form a 3rd pair of resource blocks, and so on. A frequency spacing between every pair of resource blocks is 16.38 MHz, occupying more than 80% of the system bandwidth. This embodiment of this application imposes no limitation on a specific value of the frequency spacing between each pair of resource blocks in the first resource set.

In scenarios of other system bandwidths and/or other subcarrier spacings, implementation of the foregoing first implementation is a process similar to the foregoing process. Details are not described herein again.

In a second implementation, frequency spacings of the pairs of resource blocks in the first resource set are in descending order, and an occupancy ratio of a smallest frequency spacing to the system bandwidth is greater than the preset threshold.

Figure 9:
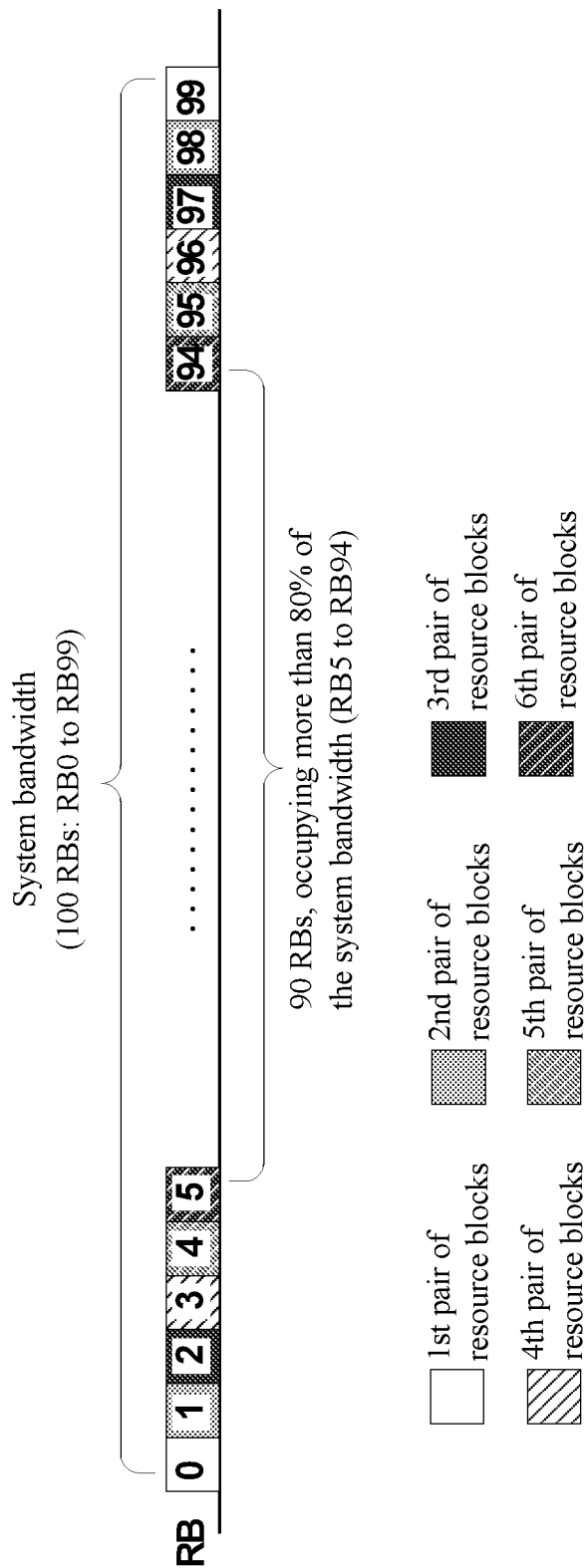
FIG. 9 is a schematic diagram of resources in a first resource set (including six pairs of resource blocks) according to still another embodiment of this application.

As shown in FIG. 9, the first resource set includes six pairs of resource blocks. RB0 and RB99 form a 1st pair of resource blocks, RB1 and RB98 form a 2nd pair of resource blocks, RB2 and RB97 form a 3rd pair of resource blocks, RB3 and RB96 form a 4th pair of resource blocks, and so on. A frequency spacing between the 1st pair of resource blocks is 18 MHz, a frequency spacing between the 2nd pair of resource blocks is 17.82 MHz, and a frequency spacing between the 3rd pair of resource blocks is 17.64 MHz, which are in descending order. A frequency spacing between a 6th pair of resource blocks is the smallest 16.02 MHz, occupying slightly more than 80% of the system bandwidth, meeting the OCB requirement.

It may be understood that the six pairs of resource blocks shown in FIG. 9 may be allocated to a plurality of terminals that need to transmit uplink data on an unlicensed frequency band. Optionally, the base station may process the rest 88 resource blocks (RB6 to RB93) other than the six pairs of resource blocks in a prior-art resource scheduling manner (for example, an uplink resource scheduling manner in LTE). This can maximize flexibility of resource allocation and improve resource utilization while ensuring that the basic OCB requirement is met.

In the first resource set shown in FIG. 9, a difference between frequency spacings corresponding to any two adjacent pairs of resource blocks is two RBs. For example, a frequency spacing between the 1st pair of resource blocks is 100 RBs, a frequency spacing between the 2nd pair of resource blocks is 98 RBs, and a frequency spacing between the 3rd pair of resource blocks is 96 RBs. FIG. 9 is merely an embodiment of implementation of the first resource set without constituting any limitation. In actual application, the first resource set may be different.

Figure 10:
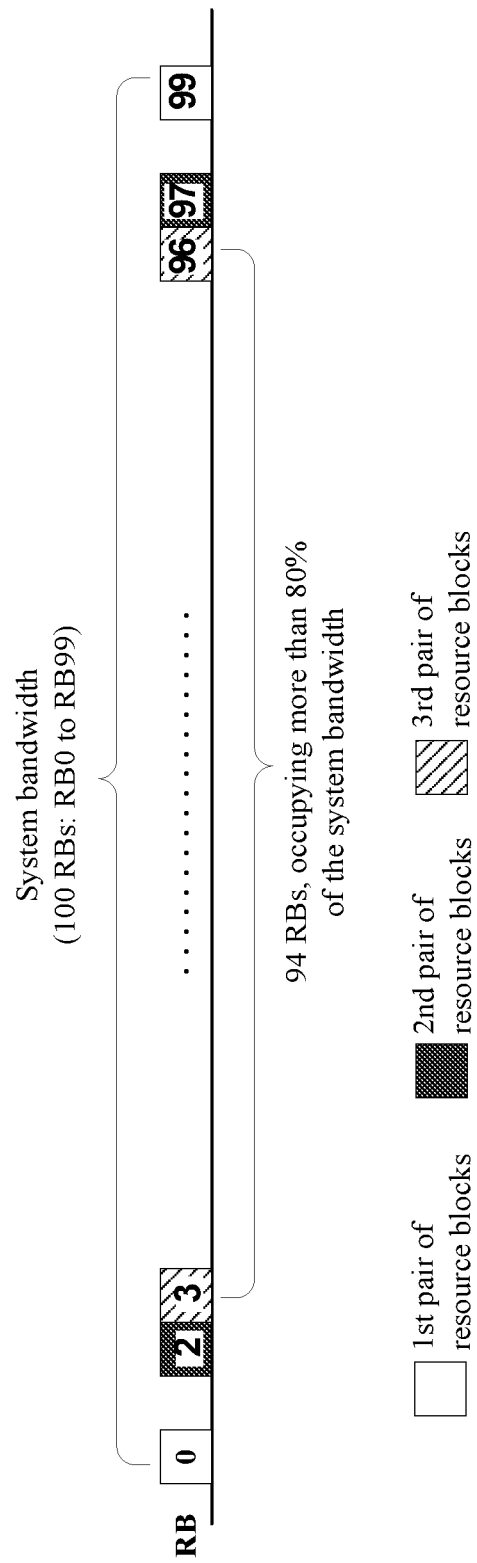
FIG. 10 is a schematic diagram of resources in a first resource set (including three pairs of resource blocks) according to yet another embodiment of this application.

It should be noted that in the first resource set, a difference between frequency spacings corresponding to two adjacent pairs of resource blocks may be differentiated without being limited to a fixed value, for example, two RBs. For example, as shown in FIG. 10, the first resource set includes three pairs of resource blocks. RB0 and RB99 form a 1st pair of resource blocks, RB2 and RB97 form a 2nd pair of resource blocks, and RB3 and RB96 form a 3rd pair of resource blocks. In this case, a difference between frequency spacings corresponding to the 1st pair of resource blocks and the 2nd pair of resource blocks is four RBs, and a difference between frequency spacings corresponding to the 2nd pair of resource blocks and the 3rd pair of resource blocks is two RBs.

In scenarios of other system bandwidths and/or other subcarrier spacings, implementation of the foregoing second implementation is a process similar to the foregoing process. Details are not described herein again.

It should be noted that the first resource set may be alternatively presented in other forms without being limited to the foregoing two implementations, provided that the occupancy ratio of every pair of resource blocks in the first resource set to the system bandwidth is greater than the preset threshold. For example, the first resource set includes the following several pairs of resource blocks: a 1st pair of resource blocks including RB0 and RB89, a 2nd pair of resource blocks including RB1 and RB88, and a 3rd pair of resource blocks including RB3 and RB92. It may be learned that the first resource set including the three pairs of resource blocks does not match the first implementation or the second implementation but still meets the OCB requirement.

In addition, it should be noted that to avoid resource collision, normally, the base station is not allowed to add uplink transmission signals of a plurality of terminals to one pair of resource blocks. However, in some possible embodiments, a plurality of terminals need to share a resource and signal interference can be avoided on the shared resource. In this case, the one or more pairs of resource blocks allocated by the base station to different terminals may coincide.

The following describes the N second resource blocks. It may be understood that the one or more pairs of first resource blocks allocated to the terminal are used to meet the OCB requirement of ETSI, and positions of the rest N second resource blocks allocated to the terminal may not be limited in frequency domain.

Optionally, an occupancy ratio of a frequency spacing formed by the N second resource blocks to the system bandwidth may be greater than the preset threshold. This means that at least two of the N second resource blocks are distributed on two ends of the system bandwidth.

Optionally, an occupancy ratio of a frequency spacing formed by the N second resource blocks to the system bandwidth may be less than the preset threshold. This means that the N second resource blocks may be distributed in intermediate frequency domain positions in the system bandwidth. It may be understood that there are only a limited quantity of resource blocks on two ends of the system bandwidth that can meet the OCB requirement. Therefore, this scheduling manner of distributing the N second resource blocks in the intermediate frequency domain positions can help the base station to allocate the limited resource blocks on the two ends to more terminals that need to transmit uplink data on an unlicensed frequency band. Specifically, the base station may further schedule resources in the intermediate frequency domain positions in a prior-art resource scheduling manner (for example, an uplink resource scheduling manner in LTE).

S104. The base station returns resource indication information to the terminal, where the resource indication information is used to indicate the resources allocated by the base station to the terminal, and includes information about a resource group.

In an embodiment of this application, the base station may add the resource indication information to downlink control information (DCI). Specifically, a new field may be added to the DCI. The field is used to indicate the one or more pairs of resource blocks allocated to the terminal, and content of the newly-added field may be indexes of the one or more pairs of resource blocks. For example, an index "1" indicates a pair of resource blocks including RB0 and RB99. This example is used to merely explain this embodiment of this application without constituting any limitation. The base station may use a related field for resource indication in an existing DCI format, for example, an RB resource assignment (Resource block assignment) field, to indicate the N second resource blocks.

For example, the base station may add the resource indication information to an uplink grant (UL grant) returned to the terminal. The UL grant herein is a type of DCI in a DCI format 0, 0A, 0B, 4, 4A, or 4B.

It should be noted that the base station may alternatively add the resource indication information to other response messages for the scheduling request, or the base station may alternatively encapsulate the resource indication information into a separate message, and return the message to the terminal. This embodiment of this application imposes no limitation on how the resource indication information is sent.

The following further describes specific implementations of the resource indication information.

In a first implementation, the resource indication information may include indexes of the one or more pairs of resource blocks that are allocated to the terminal, in the first resource set. For example, assuming that a 1st pair of resource blocks in the first resource set shown in FIG. 7 are allocated to the terminal, the resource indication information sent to the terminal may include an index "1" of the 1st pair of resource blocks. This example is used to merely explain this embodiment of this application without constituting any limitation.

If the N second resource blocks allocated to the terminal are also one or more pairs of resource blocks in the first resource set, the resource indication information further includes indexes of the one or more pairs of resource blocks corresponding to the N second resource blocks, in the first resource set. If the N second resource blocks allocated to the terminal are not resource blocks in the first resource set, the resource indication information further includes resource block numbers of the N second resource blocks.

In a second implementation, the resource indication information may include resource block numbers of the M first resource blocks allocated to the terminal and resource block numbers of the N second resource blocks allocated to the terminal.

Specifically, resource blocks in the entire system bandwidth may be numbered, and a specific resource block can be indicated by using a resource block number. The resource block number herein may also be referred to as a resource block index.

It should be noted that more resource indication manners may be agreed upon between the base station and the terminal, rather than being limited to the foregoing two implementations.

S105. After receiving the resource indication information, the terminal may process a signal based on the resource indication information, for example, modulating to-be-transmitted uplink data onto the resources indicated by the resource indication information, and processing frequency multiplexing and resource sharing for a transmit signal.

S106. The terminal sends, to the base station, processed uplink data on the resources indicated by the resource indication information.

In the embodiment in FIG. 5, the M first resource blocks allocated to the terminal are the one or more pairs of resource blocks in the first resource set, the occupancy ratio of the frequency spacing between every pair of resource blocks in the first resource set to the system bandwidth is greater than the preset threshold, and the rest N second resource blocks allocated to the terminal may be distributed in any frequency domain positions. In this way, resource scheduling can be more flexible while the OCB requirement of ETSI is met.

Figure 11:
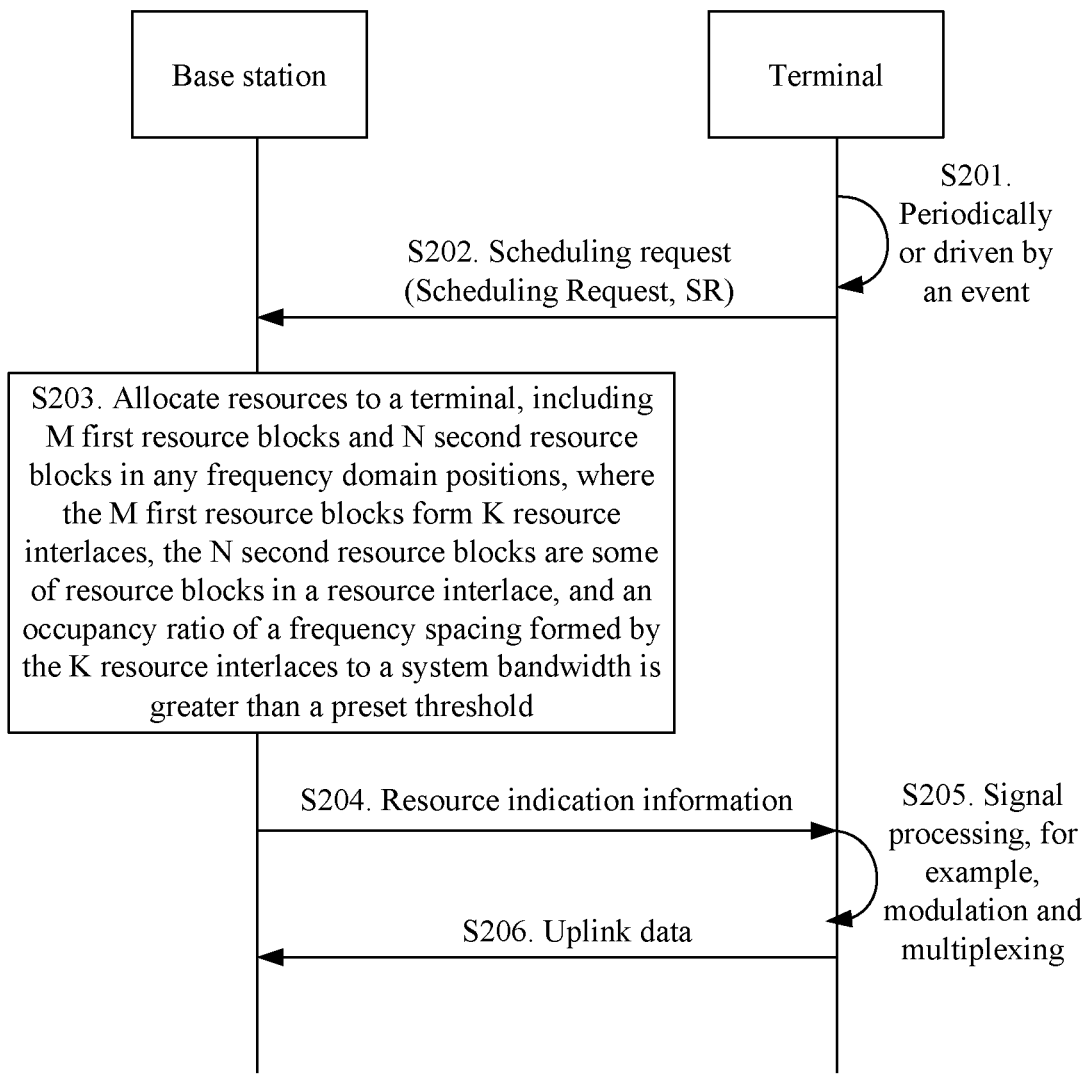
FIG. 11 is a schematic flowchart of a resource allocation method according to an embodiment of this application.

FIG. 11 shows a resource allocation method according to another embodiment of this application. In the embodiment in FIG. 11, while allocation of at least one complete resource interlace to a terminal is ensured, one resource interlace (or some resource interlace(s)) may be split, so that a plurality of terminals share one complete resource interlace. In this way, resource configuration is more flexible, and resource utilization is improved. As shown in FIG. 11, the method may include the following steps.

S202. A base station receives a scheduling request (SR) sent by the terminal. The scheduling request is used to request the base station to allocate uplink transmission resources.

Referring to S201, the terminal may send the scheduling request to the base station periodically. For example, the terminal sends the scheduling request to the base station once every transmission time interval (TTI). Alternatively, the terminal may send the scheduling request to the base station when driven by an event. For example, when there is uplink data to be transmitted, the terminal sends the scheduling request to the base station. Arrival of the uplink data herein is an event driving the terminal to send the scheduling request. This embodiment of this application imposes no limitation on a mechanism for triggering the terminal to send the scheduling request.

S203. In response to the scheduling request, the base station allocates resources to the terminal, the resources including M first resource blocks and N second resource blocks that are in any frequency domain positions, where the M first resource blocks form K (where K≥1, and K is a positive integer) resource interlace(s), and an occupancy ratio of a frequency spacing formed by the K resource interlace(s) to a system bandwidth is greater than a preset threshold; and the N second resource blocks are some of resource blocks in a resource interlace, and the resource interlace to which the N second resource blocks belong is allocated to a plurality of terminals.

It may be understood that the N second resource blocks are a partial resource interlace (partial interlace). In this way, a quantity of resource blocks allocated by the base station to the terminal can be more flexible, without necessarily being an integer quantity of resource interlace(s). In addition, the resource interlace to which the N second resource blocks belong may be shared by the plurality of terminals. This can improve resource utilization.

Figure 12:
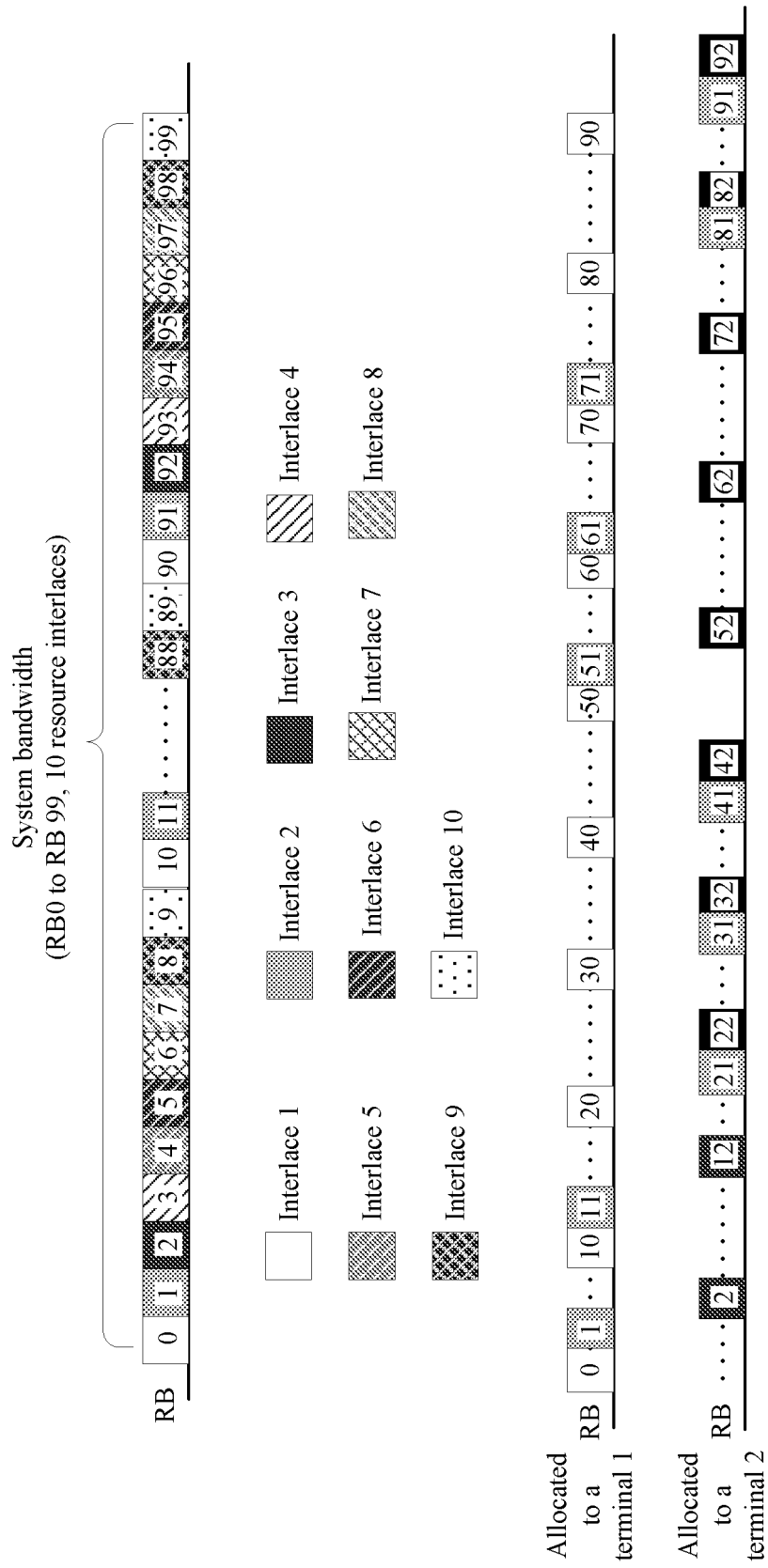
FIG. 12 is a schematic diagram of resource allocation in which a resource interlace is used as a scheduling unit, according to an embodiment of this application.

Referring to FIG. 12, a 20 MHz system bandwidth and a 15 kHz subcarrier spacing supported by the 5 GHz frequency band (an unlicensed frequency band) are used as an example. For the 20 MHz system bandwidth, excluding guard bands (approximately 10% of the system bandwidth), there are 100 RBs remaining to serve as a system transmission bandwidth. Assuming that each interlace includes 10 RBs, the transmission bandwidth includes 10 resource interlace(s). It should be understood that an occupancy ratio of a frequency spacing corresponding to every resource interlace to the system bandwidth meets the OCB requirement of ETSI.

In an LTE communications system, there is a principle for allocating resources for a physical uplink shared channel (PUSCH): A total quantity $N_{RB}$ of RBs allocated to the terminal needs to be a product of 2, 3, and 5. To be specific, it is required that $N_{RB}=2^x \times 3^y \times 5^z$, where x, y, and z need to be non-negative integers. Therefore, the quantity ($N_{RB}$) of RBs allocated to the terminal and used for PUSCH transmission needs to belong to a set shown in FIG. 13. If $N_{RB}=a \times 10+b$, when a=1, a value of b ranges in {0, 2, 5, 6, 8}. Therefore, a complete interlace may be split into two or more partial interlace(s), and a value of a quantity of RBs in a partial interlace may be selected from {0, 2, 5, 6, 8}.

As shown in FIG. 12, a resource interlace 1 is allocated to a terminal 1, and a resource interlace 3 is allocated to a terminal 2. A complete resource interlace 2 is split into two parts. A first part is {RB1, RB11, RB51, RB61, RB71}, and a second part is {RB21, RB31, RB41, RB81, RB91}. The first part is allocated to the terminal 1, and the second part is allocated to the terminal 2. In this way, the resource interlace 1 and the resource interlace 3 may be used to ensure that transmission bandwidths for uplink signals of the terminal 1 and the terminal 2 comply with the OCB regulation of ETSI. In addition, the resource interlace 2 is shared by the terminal 1 and the terminal 2, improving resource utilization.

For the terminal 1, the M (actually 10) first resource blocks allocated to the terminal 1 form the resource interlace 1, and the N (actually 5) second resource blocks allocated to the terminal 1 are some of resource blocks, namely, the first part, of the resource interlace 2.

It should be noted that, for one terminal, the N second resource blocks may be from one interlace. Refer to the terminal 1 in FIG. 12. For one terminal, the N second resource blocks may alternatively be from a plurality of interlace(s). For example, assuming that 18 RBs are allocated to a terminal 3, a resource interlace 5 may be allocated to the terminal 3, {RB3, RB13, RB23, RB33, RB43} in a resource interlace 4 are allocated to the terminal 3, and {RBS, RB15, RB35} in a resource interlace 6 are also allocated to a terminal 5. To be specific, the N (actually 8) second resource blocks allocated to the terminal 3 are from these two resource interlace(s): the resource interlace 4 and the resource interlace 6. This example is used to merely explain this embodiment of this application without constituting any limitation.

It may be understood that in the scenario shown in FIG. 12, when a quantity of RBs that need to be allocated to the terminal is not an integer multiple of 10, resources may be allocated as a combination of a complete resource interlace and a partial resource interlace (partial interlace). When a quantity of RBs allocated to the terminal is an integer multiple of 10, resource allocated to the terminal may be a complete resource interlace alone, or a combination of a complete resource interlace (interlace) and a partial resource interlace (partial interlace).

S204. The base station returns resource indication information to the terminal, where the resource indication information is used to indicate the resources allocated by the base station to the terminal.

In an embodiment of this application, the base station may add the resource indication information to downlink control information (DCI). Specifically, a new field may be added to the DCI. The field is used to indicate the one or more pairs of resource blocks allocated to the terminal, and content of the newly-added field may be indexes of the one or more pairs of resource blocks. For example, an index "1" indicates a pair of resource blocks including RB0 and RB99. This example is used to merely explain this embodiment of this application without constituting any limitation. The base station may use a related field for resource indication in an existing DCI format, for example, an RB resource assignment (Resource block assignment) field, to indicate the N second resource blocks.

For example, the base station may add the resource indication information to an uplink grant (UL grant) returned to the terminal. The UL grant herein is a type of DCI in a DCI format 0, 0A, 0B, 4, 4A, or 4B.

It should be noted that the base station may alternatively add the resource indication information to other response messages for the scheduling request, or the base station may alternatively encapsulate the resource indication information into a separate message, and return the message to the terminal. This embodiment of this application imposes no limitation on how the resource indication information is sent.

The following further describes example implementations of the resource indication information in the method shown in FIG. 12.

In a first implementation, the resource indication information may include any one or more of the following: interlace indexes of the K resource interlace(s), an interlace index of the resource interlace to which the N second resource blocks belong, or resource block indexes of the N second resource blocks in the resource interlace to which the N second resource blocks belong.

Specifically, the base station may index, with numbers, resource interlace(s) included in the entire system bandwidth. For example, the resource interlace 1 to the resource interlace 10 in FIG. 12 may be indexed with numbers 1 to 10. Alternatively, the base station may index, with numbers, resource blocks included in each resource interlace. For example, 10 resource blocks included in each resource interlace in FIG. 12 are indexed with numbers 0 to 9.

The terminal 1 in FIG. 12 is used as an example for description. Resources allocated to the terminal 1 include resource blocks in the resource interlace 1 and the first part of resource blocks in the resource interlace 2. The resource indication information for the terminal 1 may include an interlace index "1" of the resource interlace 1, an interlace index "2" of the resource interlace 2, and indexes "0" (RB1), "1" (RB11), "6" (RB51), "7" (RB61), and "8" (RB71) of the first part of resource blocks in the resource interlace 2.

In the foregoing first implementation, the resource indication information may further include attribute indication information corresponding to the resource interlace (which is a partial interlace) to which the N second resource blocks belong, to indicate that only some of resource blocks in the resource interlace to which the N second resource blocks belong are allocated to the terminal. The resource interlace to which the N second resource blocks belong is split into a plurality of parts, and the plurality of parts are shared by the plurality of terminals.

In a second implementation, the resource indication information may further include resource block numbers of the M first resource blocks allocated to the terminal and resource block numbers of the N second resource blocks allocated to the terminal.

Specifically, resource blocks in the entire system bandwidth may be numbered, and a specific resource block can be indicated by using a resource block number. The resource block number herein may also be referred to as a resource block index.

It should be noted that more resource indication manners may be agreed upon between the base station and the terminal, rather than being limited to the foregoing two implementations. For example, the resource indication information may include interlace indexes of the K resource interlace(s) and resource block numbers of the N second resource blocks. This example is merely an implementation of this embodiment of this application without constituting any limitation. In actual application, different implementations may be used.

S205. After receiving the resource indication information, the terminal may process a signal based on the resource indication information, for example, modulating to-be-transmitted uplink data onto the resources indicated by the resource indication information, and processing frequency multiplexing and resource sharing for a transmit signal.

S206. The terminal sends, to the base station, processed uplink data on the resources indicated by the resource indication information.

In the embodiment in FIG. 11, the M first resource blocks allocated to the terminal form the K resource interlace(s), the occupancy ratio of the frequency spacing formed by the K resource interlace(s) to the system bandwidth is greater than the preset threshold, the rest N second resource blocks allocated to the terminal are some of resource blocks in the resource interlace, and the resource interlace to which the N second resource blocks belong is split into a plurality of parts that are shared by the plurality of terminals. In this way, resource scheduling can be more flexible and resource utilization can be improved while the OCB requirement of ETSI is met.

In some embodiments of this application, to adapt to scenarios with a plurality of system bandwidths and/or a plurality of subcarrier spacings, the K resource interlace(s) may include H resource blocks, where H is a positive integer, and H is divisible by a total quantity of resource blocks that correspond to each of a plurality of transmission bandwidths corresponding to an unlicensed frequency band. The following provides further descriptions by using examples.

First, the 5 GHz frequency band is used as an example. For future new radio (NR) communications technologies, system bandwidths that can be supported include 20 MHz, 40 MHz, 80 MHz, 160 MHz, and the like, and selectable subcarrier spacings include 15 kHz, 60 kHz, and the like.

A. For the 15 kHz subcarrier spacing, transmission bandwidths corresponding to these system bandwidth scenarios may be 100 RBs, 200 RBs, 400 RBs, and 800 RBs, respectively. These system bandwidth scenarios require that a bandwidth for occupation by signals be greater than 89 RBs, 178 RBs, 356 RBs, and 712 RBs, respectively, while the OCB requirement of ETSI is met (80% of the system bandwidth is occupied). Resource blocks in a resource interlace are evenly distributed in the entire transmission bandwidth. Therefore, there are the following several resource interlace structures that are compatible with the foregoing system bandwidth scenarios:

(1) Each resource interlace includes 10 RBs. In the foregoing system bandwidth scenarios, bandwidths occupied by one resource interlace are 91 RBs, 181 RBs, 361 RBs, and 721 RBs, respectively.

(2) Each resource interlace includes 25 RBs. In the foregoing system bandwidth scenarios, bandwidths occupied by one resource interlace are 97 RBs, 193 RBs, 385 RBs, and 769 RBs, respectively.

It may be understood that, for the 15 kHz subcarrier spacing, quantities of resource blocks included in the two resource interlace(s) in (1) and (2) are both divisible by total quantities of resource blocks corresponding to the foregoing system bandwidths, so that the base station can use a resource interlace as a resource scheduling unit.

B. For the 60 kHz subcarrier spacing, transmission bandwidths corresponding to the foregoing system bandwidth scenarios may be 25 RBs, 50 RBs, 100 RBs, and 200 RBs, respectively. These system bandwidth scenarios require that a bandwidth for occupation by signals be greater than 23 RBs, 45 RBs, 89 RBs, and 178 RBs, respectively, while the OCB requirement of ETSI is met (80% of the system bandwidth is occupied). Resource blocks in a resource interlace are evenly distributed in the entire transmission bandwidth. Therefore, a resource interlace structure that is compatible with the foregoing system bandwidth scenarios may be as follows: Each resource interlace includes 25 RBs. In the foregoing system bandwidth scenarios, bandwidths occupied by one resource interlace are 25 RBs, 49 RBs, 97 RBs, and 193 RBs, respectively.

In conclusion, uplink resources on the 5 GHz frequency band may be allocated in the following two schemes:

(1) To be compatible with all scenarios (with the 15 kHz or 60 kHz subcarrier spacing), a fixed 25 RBs/interlace scheme (where each resource interlace includes 25 RBs) may be used.

(2) To adapt to various service requirements, both 10 RBs/interlace and 25 RBs/interlace may be supported. When resource allocation is indicated, type information of an interlace (10 RBs/interlace or 25 RBs/interlace) further needs to be carried in the resource indication information.

Therefore, on the 5 GHz frequency band, the K resource interlace(s) allocated to the terminal may include a plurality of resource interlace(s) with different structures, and the resource indication information may further include type information of the plurality of resource interlace(s) with different structures.

It should be noted that the foregoing example analysis of the 5 GHz frequency band is used to merely explain this embodiment of this application, and actual values of specific parameters such as the transmission bandwidth and the subcarrier spacing in the foregoing system bandwidth scenarios are all subject to definitions in future standards.

Then, the 60 GHz frequency band is used as an example. For future new radio (NR) communications technologies, system bandwidths that can be supported include 500 MHz, 1 GHz, 2 GHz, and the like, and selectable subcarrier spacings include 480 kHz, 960 kHz (only supported when the system bandwidth is 2 GHz), and the like.

A. For the 480 kHz subcarrier spacing, transmission bandwidths corresponding to the foregoing system bandwidth scenarios may be 78 RBs, 156 RBs, and 312 RBs, respectively. These system bandwidth scenarios require that a bandwidth for occupation by signals be greater than 61 RBs, 122 RBs, and 244 RBs, respectively, while the OCB requirement of ETSI is met (more than 70% of the system bandwidth is occupied). Resource blocks in a resource interlace are evenly distributed in the entire transmission bandwidth. Therefore, a resource interlace structure that is compatible with the foregoing system bandwidth scenarios may be as follows: Each resource interlace includes six RBs. In the foregoing system bandwidth scenarios, bandwidths occupied by one resource interlace are 66 RBs, 131 RBs, and 261 RBs, respectively.

B. For the 960 kHz subcarrier spacing, a transmission bandwidth corresponding to the 2 GHz system bandwidth may be 156 RBs. This requires that a bandwidth for occupation by signals be greater than 122 RBs, while the OCB requirement of ETSI is met (more than 70% of the system bandwidth is occupied). Resource blocks in a resource interlace are evenly distributed in the entire transmission bandwidth. Therefore, a resource interlace structure that adapts to the 2 GHz system bandwidth scenario may be as follows: Each resource interlace includes six RBs. In the 2

GHz system bandwidth scenario, a bandwidth occupied by one resource interlace is 131 RBs.

In conclusion, uplink resources on the 60 GHz frequency band may be allocated by using a fixed 6 RBs/interlace scheme (where each resource interlace includes six RBs).

It should be noted that the foregoing example analysis of the 60 GHz frequency band is used to merely explain this embodiment of this application, and actual values of specific parameters such as the transmission bandwidth and the subcarrier spacing in the foregoing system bandwidth scenarios are all subject to definitions in future standards.

Optionally, in scenarios with a plurality of system bandwidths and/or a plurality of subcarrier spacings supported in this embodiment of this application, a complete resource interlace allocated to the terminal may be indicated by using a resource indication value (RIV).

Specifically, it is assumed that $N_{RB}^{UL}$ is the system transmission bandwidth, and the RB set allocated to the terminal may be denoted by $RB_{START}+l+i \cdot N$, where $RB_{START}$ indicates a start RB allocated to the terminal, $l=0, 1, \ldots L-1$, where L is a quantity of complete resource interlace(s) allocated to the terminal, and $N=\lfloor N_{RB}^{UL}/g \rfloor$, where g is a quantity of RBs included in one resource interlace. The following provides descriptions by using examples.

In example 1, as shown in FIG. 7, it is assumed that resource allocation starts from RB0 ($RB_{start}=0$), the system bandwidth (100 RBs) is equivalent to 10 resource interlace(s) (N=10), and one resource interlace (L=1) is allocated to the terminal. Therefore, the RB set allocated to the terminal is:

$$0+\{(1-0)\}+\{0,1,\ldots,9\} \times 10=\{0,10,20,30,\ldots,90\}$$

A resource interlace represented by this set is the 1st resource interlace in FIG. 7.

In example 2, as shown in FIG. 7, it is assumed that RB allocation starts from RB0 ($RB_{start}=0$), the system bandwidth (100 RBs) is equivalent to 10 resource interlace(s) (N=10), and two resource interlace(s) (L=2) are allocated to the terminal. Therefore, the RB set allocated to the terminal is:

$$0+\{(1-0),(2-1)\}+\{0,1,\ldots,9\} \times 10=\{0,10,20,30,\ldots,90\} \& \{1,11,21,31,\ldots,91\}$$

Two resource interlace(s) represented by the foregoing two sets are the 1st resource interlace and the 2nd resource interlace in FIG. 7.

It should be noted that the foregoing examples are used to merely explain this embodiment of this application without constituting any limitation.

It may be learned from a prior-art RIV calculation algorithm in 3GPP TS 36.213 that when $(L-1) \leq \lfloor N/2 \rfloor$, $RIV=N(L-1)+RB_{start}$; and otherwise, $RIV=N(N-L+1)+(N-1-RB_{START})$.

It should be noted that this RIV indication manner may be mainly used to indicate complete resource interlace(s) allocated to the terminal. The resource indication manner described previously may be used as a supplement to indicate the rest N second resource blocks allocated to the terminal. Details are not described herein again.

Figures 13, 14:
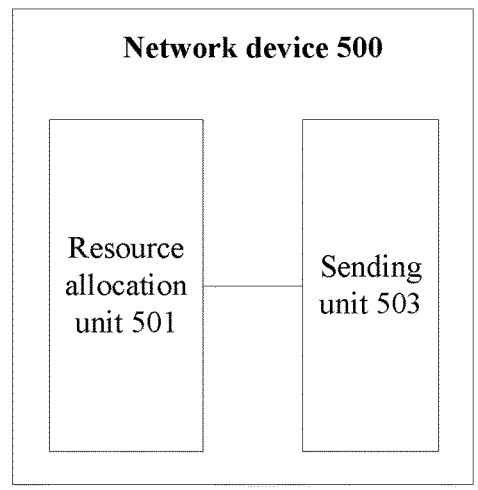
FIG. 13 is a schematic diagram of a resource set defined in LTE that can be used for PUSCH transmission.
FIG. 14 is a schematic structural diagram of a network device according to an embodiment of this application.

FIG. 14 shows a network device according to an embodiment of this application. The network device 500 may be the base station in the foregoing method embodiments, and may be configured to: receive a scheduling request of a terminal, and allocate uplink signal transmission resources to the terminal on an unlicensed frequency band. As shown in FIG. 14, the network device 500 may include a resource allocation unit 501 and a sending unit 503.

The resource allocation unit 501 may be configured to allocate a resource group including M first resource blocks to the terminal when allocating uplink resources, where an occupancy ratio of a frequency spacing formed by the M first resource blocks to a system bandwidth is greater than a preset threshold, and the resource group further includes N second resource blocks in any frequency domain positions, where M≥2, N≥1, and both M and N are positive integers.

The sending unit 503 may be configured to send resource indication information to the terminal, where the resource indication information is used to indicate the resource group allocated to the terminal and includes information about the resource group.

In this embodiment of this application, the M first resource blocks are used to comply with the OCB regulation of ETSI, and the N second resource blocks are used to implement flexible resource scheduling.

In this embodiment of this application, the resources allocated by the resource allocation unit 501 to the terminal may include the following two cases.

In a first case, the M first resource blocks are one or more pairs of resource blocks in a first resource set, and an occupancy ratio of a frequency spacing between every pair of resource blocks in the first resource set to the system bandwidth is greater than the preset threshold.

Optionally, a same frequency spacing is present between every pair of resource blocks in the first resource set, and the occupancy ratio of the frequency spacing between every pair of resource blocks to the system bandwidth is greater than the preset threshold. Optionally, frequency spacings of the pairs of resource blocks in the first resource set are in descending order, and an occupancy ratio of a smallest frequency spacing to the system bandwidth is greater than the preset threshold.

It should be noted that the first resource set may be alternatively presented in other forms without being limited to the foregoing two implementations, provided that the occupancy ratio of every pair of resource blocks in the first resource set to the system bandwidth is greater than the preset threshold.

It may be understood that the one or more pairs of resource blocks allocated to the terminal are used to meet the OCB requirement of ETSI, and positions of the rest N second resource blocks allocated to the terminal are not limited in frequency domain.

Optionally, an occupancy ratio of a frequency spacing formed by the N second resource blocks to the system bandwidth may be greater than the preset threshold. This means that at least two of the N second resource blocks are distributed on two ends of the system bandwidth.

Optionally, an occupancy ratio of a frequency spacing formed by the N second resource blocks to the system bandwidth may be less than the preset threshold. This means that the N second resource blocks may be distributed in intermediate frequency domain positions in the system bandwidth. It may be understood that there are only a limited quantity of resource blocks on two ends of the system bandwidth that can meet the OCB requirement. Therefore, this scheduling manner of distributing the N second resource blocks in the intermediate frequency domain positions can help the base station to allocate the limited resource blocks on the two ends to more terminals that need to transmit uplink data on an unlicensed frequency band.

In a second case, the M first resource blocks form K (where K≥1, and K is a positive integer) resource interlace(s). An occupancy ratio of a frequency spacing formed by the K resource interlace(s) to the system bandwidth is greater than the preset threshold. The N second resource blocks are some of resource blocks in a resource interlace, and the resource interlace to which the N second resource blocks belong is allocated to a plurality of terminals.

It may be understood that the N second resource blocks are a partial resource interlace (partial interlace). In this way, a quantity of resource blocks allocated by the base station to the terminal can be more flexible, without necessarily being an integer quantity of resource interlace(s). In addition, the resource interlace to which the N second resource blocks belong may be shared by the plurality of terminals. This can improve resource utilization.

In this embodiment of this application, the resource indication information sent by the sending unit 503 may be specifically implemented as follows:

For the foregoing first resource allocation case:

In a first implementation, the resource indication information may include indexes of the one or more pairs of resource blocks that are allocated to the terminal, in the first resource set. If the N second resource blocks allocated to the terminal are also one or more pairs of resource blocks in the first resource set, the resource indication information further includes indexes of the one or more pairs of resource blocks corresponding to the N second resource blocks, in the first resource set. If the N second resource blocks allocated to the terminal are not resource blocks in the first resource set, the resource indication information further includes resource block numbers of the N second resource blocks.

In a second implementation, the resource indication information may further include resource block numbers of the M first resource blocks allocated to the terminal and resource block numbers of the N second resource blocks allocated to the terminal.

For the foregoing second resource allocation case:

In a first implementation, the resource indication information may include interlace indexes of the K resource interlace(s), an interlace index of the resource interlace to which the N second resource blocks belong, and resource block indexes of the N second resource blocks in the resource interlace to which the N second resource blocks belong.

In the foregoing first implementation, the resource indication information may further include attribute indication information corresponding to the resource interlace (which is a partial interlace) to which the N second resource blocks belong, to indicate that only some of resource blocks in the resource interlace to which the N second resource blocks belong are allocated to the terminal. The resource interlace to which the N second resource blocks belong is split into a plurality of parts, and the plurality of parts are shared by the plurality of terminals.

In a second implementation, the resource indication information may further include resource block numbers of the M first resource blocks allocated to the terminal and resource block numbers of the N second resource blocks allocated to the terminal.

In this embodiment of this application, the sending unit 503 may send the resource indication information by using the following several implementations.

In one implementation, the sending unit 503 may add the resource indication information to downlink control information (DCI). Specifically, the sending unit 503 may add a new field to the DCI. The field is used to indicate the one or more pairs of resource blocks allocated to the terminal, and content of the newly-added field may be indexes (index) of the one or more pairs of resource blocks. For example, an index "1" indicates a pair of resource blocks including RB0 and RB99. This example is used to merely explain this embodiment of this application without constituting any limitation. The sending unit 503 may use a related field for resource indication in an existing DCI format, for example, an RB resource assignment (Resource block assignment) field, to indicate the N second resource blocks.

For example, the sending unit 503 may add the resource indication information to an uplink grant (UL grant) returned to the terminal. The UL grant herein is a type of DCI in a DCI format 0, 0A, 0B, 4, 4A, or 4B.

It should be noted that the sending unit 503 may alternatively add the resource indication information to other response messages for the scheduling request, or the sending unit 503 may alternatively encapsulate the resource indication information into a separate message, and return the message to the terminal. This embodiment of this application imposes no limitation on how the resource indication information is sent by the sending unit 503.

It may be understood that for specific implementations of the function units included in the network device 500, refer to the method embodiment corresponding to FIG. 5 or FIG. 11. Details are not described herein again.

In addition, an embodiment of this application further provides a wireless communications system. The wireless communications system may be the wireless communications system 200 shown in FIG. 2, and may include a base station and a terminal. The terminal may be the terminal in the method embodiment corresponding to FIG. 5 or FIG. 11. The base station may be the base station in the method embodiment corresponding to FIG. 5 or FIG. 11.

Specifically, the terminal may be the terminal 300 shown in FIG. 3. The base station may be the base station 400 shown in FIG. 4, or may be the network device 500 shown in FIG. 14.

For specific implementations of the base station and the terminal, refer to the method embodiment corresponding to FIG. 5 or FIG. 11. Details are not described herein again.

In conclusion, by practicing this embodiment of this application, scheduling of uplink resources can be more flexible for use of an unlicensed frequency band while the OCB requirement of ETSI is met. In addition, resource utilization can be improved.

A person of ordinary skill in the art may understand that all or some processes of the methods in the foregoing embodiments may be implemented by a computer program instructing related hardware. The program may be stored in a computer readable storage medium. When the program is executed, the processes in the foregoing method embodiments can be performed. The storage medium includes any medium that can store program code, such as a ROM, a random access memory RAM, a magnetic disk, or an optical disc.

Referring to the embodiment shown in FIG. 11, at least one complete interlace needs to be allocated to the terminal. In other words, the M first resource blocks are composed of K resource interlace(s). When the system bandwidth is known, interlace structures in different transmission bandwidth scenarios and/or scenarios with a plurality of subcarrier spacings need to meet the following two conditions:

$$N_{RB}^{UL} \bmod N_{RB}^{interlace}=0, \text{ and}$$

$$(N_{RB}^{UL}-N_{RB}^{spacing}+1) \times BW^{RB}/BW > \text{threshold, where}$$

$N_{RB}^{UL}$ indicates a quantity of RBs corresponding to the transmission bandwidth, $N_{RB}^{interlace}$ indicates a quantity (M=K×$N_{RB}^{interlace}$) of RBs included in each $N_{RB}^{spacing}$ indicates a spacing between two adjacent RBs in each interlace, $BW^{RB}$ indicates a bandwidth occupied by each RB, BW indicates the system bandwidth, and the threshold indicates the OCB requirement. For example, for the low-frequency 5 GHz frequency band, the threshold is 80%; and for the high-frequency 60 GHz frequency band, the threshold is 70%.

Specifically, the foregoing first condition ($N_{RB}^{UL}$ mod $N_{RB}^{interlace}$=0) is used to determine the interlace structures in different transmission bandwidth scenarios, so that the entire transmission bandwidth can be split into an integer quantity of interlace(s). The foregoing second condition (($N_{RB}^{UL}-N_{RB}^{spacing}+1)\times BW^{RB}$/BW>threshold) is used to control a frequency spacing of an interlace, so that a ratio of the frequency spacing (($N_{RB}^{UL}-N_{RB}^{spacing}+1)\times BW^{RB}$) of an interlace to the system bandwidth BW meets the OCB requirement.

The following describes, by using Table 1 and Table 2 as an example, how a corresponding resource interlace structure is designed for scenarios with a plurality of system bandwidths and/or a plurality of subcarrier spacings. Table 1 gives examples of interlace structures for different transmission bandwidths in a low-frequency scenario, and Table 2 gives examples of interlace structures for different transmission bandwidths in a high-frequency scenario. In the low-frequency scenario and the high-frequency scenario, system bandwidths are different. For example, in the low-frequency scenario, the system bandwidth is set to including but not being limited to 20 MHz, 40 MHz, or 80 MHz; and in the high-frequency scenario, the system bandwidth is set to including but not being limited to 500 MHz or 1 GHz. In addition, in the low-frequency scenario and the high-frequency scenario, subcarrier spacings are also different. For example, in the low-frequency scenario, the subcarrier spacing is set to including but not being limited to 15 kHz or 60 kHz; and in the high-frequency scenario, the subcarrier spacing is set to including but not being limited to 120 kHz or 240 kHz.

The following first describes parameters included in Table 1 and Table 2. These parameters meet the foregoing two conditions: ($N_{RB}^{UL}$ mod $N_{RB}^{interlace}$=0) and (($N_{RB}^{UL}-N_{RB}^{spacing}+1)\times BW^{RB}$/BW>threshold). Among these parameters, RB number indicates a quantity ($N_{RB}^{UL}$) of RBs corresponding to the transmission bandwidth, subcarrier number indicates a quantity of subcarriers, interlace structure indicates a quantity ($N_{RB}^{interlace}$) of RBs included in each interlace, RB spacing indicates a spacing ($N_{RB}^{spacing}$) ($N_{RB}^{spacing}=N_{RB}^{UL}/N_{RB}^{interlace}$) between two adjacent RBs in each interlace. Table 1 corresponds to the low-frequency scenario, and threshold=80% is used as an example. Table 2 corresponds to the high-frequency scenario, and threshold=70% is used as an example.

For example, in the low-frequency scenario, the system bandwidth (BW) is 20 MHz, the subcarrier spacing (subcarrier spacing, SCS) is 15 kHz, and threshold=80%, meeting the OCB requirement. It is assumed that the corresponding transmission bandwidth is $N_{RB}^{UL}$=110, and $BW^{RB}$=0.18 MHz. To meet the foregoing two conditions, at least the following five interlace structures may be obtained. Details are as follows:

In a first interlace structure, each interlace includes five RBs, and a spacing between two adjacent RBs is equal to 22 RBs.

In a second interlace structure, each interlace includes 10 RBs, and a spacing between two adjacent RBs is equal to 11 RBs.

In a third interlace structure, each interlace includes 11 RBs, and a spacing between two adjacent RBs is equal to 10 RBs.

In a fourth interlace structure, each interlace includes 22 RBs, and a spacing between two adjacent RBs is equal to five RBs.

In a fifth interlace structure, each interlace includes 55 RBs, and a spacing between two adjacent RBs is equal to two RBs.

Refer to Table 1. It should be noted that the foregoing interlace(s) can be directly obtained by searching Table 1. Specifically, in Table 1, one or more parameter values included in a 3rd column (interlace structure) sequentially correspond to one or more parameter values included in a 4th column (RB spacing), and two corresponding parameters represent a quantity of RBs included in an interlace (interlace structure) and an RB spacing in the interlace (RB spacing), respectively. Further, RB number=110 is used as an example. In Table 1, when RB number=110, the 3rd column includes five parameter values: 5, 10, 11, 22, and 55, and the 4th column includes five parameter values: 22, 11, 10, 5, and 2. 5 in the 3rd column corresponds to 22 in the 4th column, which is the foregoing first interlace structure. 10 in the 3rd column corresponds to 11 in the 4th column, which is the foregoing second interlace structure. 11 in the 3rd column corresponds to 10 in the 4th column, which is the foregoing third interlace structure. 22 in the 3rd column corresponds to 5 in the 4th column, which is the foregoing fourth interlace structure. 55 in the 3rd column corresponds to 2 in the 4th column, which is the foregoing fifth interlace structure.

For another example, in the high-frequency scenario, the system bandwidth is 500 MHz, the subcarrier spacing is 240 kHz, and threshold=70%, meeting the OCB requirement. It is assumed that the corresponding transmission bandwidth is $N_{RB}^{UL}$=156, and $BW^{RB}$=2.88 MHz. To meet the foregoing two conditions, at least the following seven interlace structures may be obtained. Details are as follows:

In a first interlace structure, each interlace includes six RBs, and a spacing between two adjacent RBs is equal to 26 RBs.

In a second interlace structure, each interlace includes 12 RBs, and a spacing between two adjacent RBs is equal to 13 RBs.

In a third interlace structure, each interlace includes 13 RBs, and a spacing between two adjacent RBs is equal to 12 RBs.

In a fourth interlace structure, each interlace includes 26 RBs, and a spacing between two adjacent RBs is equal to six RBs.

In a fifth interlace structure, each interlace includes 39 RBs, and a spacing between two adjacent RBs is equal to four RBs.

In a sixth interlace structure, each interlace includes 52 RBs, and a spacing between two adjacent RBs is equal to three RBs.

In a seventh interlace structure, each interlace includes 78 RBs, and a spacing between two adjacent RBs is equal to two RBs.

Refer to Table 2. It should be noted that the foregoing interlace(s) can be directly obtained by searching Table 2. Specifically, in Table 2, one or more parameter values included in a 3rd column (interlace structure) sequentially correspond to one or more parameter values included in a 4th column (RB spacing), and two corresponding parameters represent a quantity of RBs included in an interlace (interlace structure) and an RB spacing in the interlace (RB spacing), respectively. Further, RB number=156 is used as an example. In Table 2, when RB number=156, the 3rd column includes seven parameter values: 6, 12, 13, 26, 39, 52, and 78, and the 4th column includes seven parameter values: 26, 13, 12, 6, 4, 3, 2. 6 in the 3rd column corresponds to 26 in the fourth column, which is the foregoing first interlace structure. 12 in the 3rd column corresponds to 13 in the 4th column, which is the foregoing second interlace structure. 13 in the 3rd column corresponds to 12 in the 4th column, which is the foregoing third interlace structure. 26 in the 3rd column corresponds to 6 in the 4th column, which is the foregoing fourth interlace structure. 39 in the 3rd column corresponds to 4 in the 4th column, which is the foregoing fifth interlace structure. 52 in the 3rd column corresponds to 3 in the 4th column, which is the foregoing sixth interlace structure. 78 in the 3rd column corresponds to 2 in the 4th column, which is the foregoing seventh interlace structure.

The foregoing examples are used to merely explain this application without constituting any limitation. Table 1 and Table 2 further show interlace structures in scenarios of a plurality of transmission bandwidths and/or a plurality of subcarrier spacings.

In addition, it may be learned from Table 1 and Table 2 that in some transmission bandwidth scenarios, an interlace structure that meets the foregoing two conditions cannot be found, as indicated by "null" in the 3rd column and the 4th column in the tables, for example, the RB number=53 and RB number=101 scenarios in Table 1, and the RB number=41 and RB number=43 scenarios in Table 2. This is because the entire transmission bandwidth cannot be split into an integer quantity of interlace(s). For these scenarios, an interlace structure in a similar transmission bandwidth scenario may be used.

It should be noted that the interlace structures for scenarios with a plurality of system bandwidths and/or a plurality of subcarrier spacings are not limited to those given in Table 1 and Table 2, and other values may be used. The parameters given in Table 1 or Table 2 may further include other parameters, for example, a bandwidth percent (bandwidth percent). Any deletion, addition, equivalent replacement, improvement, or the like made to the parameters based on Table 1, Table 2, and the technical solutions of this application shall fall within the protection scope of this application.

TABLE 1

| RB Number | Sub-carrier Number | Interlace Structure (RBs/Interlace) | RB Spacing |
|---|---|---|---|
| 25 | 300 | 25 | 1 |
| 26 | 312 | 13 | 2 |
| 27 | 324 | 9 | 3 |
| 50 | 600 | 10, 25 | 5, 2 |
| 51 | 612 | 17 | 3 |
| 52 | 624 | 13, 26 | 4, 2 |
| 53 | 636 | Null | Null |
| 54 | 648 | 6, 9, 18, 27 | 9, 6, 3, 2 |
| 55 | 660 | 5, 11 | 11, 5 |
| 100 | 1200 | 10, 20, 25, 50 | 10, 5, 4, 2 |
| 101 | 1212 | Null | Null |
| 102 | 1224 | 17, 34, 51 | 6, 3, 2 |
| 103 | 1236 | Null | Null |
| 104 | 1248 | 8, 13, 26, 52 | 13, 8, 4, 2 |
| 105 | 1260 | 7, 15, 21, 35 | 15, 7, 5, 3 |
| 106 | 1272 | 53 | 2 |
| 107 | 1284 | Null | Null |
| 108 | 1296 | 6, 9, 12, 18, 27, 36, 54 | 18, 12, 9, 6, 4, 3, 2 |

TABLE 1-continued

| RB Number | Sub-carrier Number | Interlace Structure (RBs/Interlace) | RB Spacing |
|---|---|---|---|
| 109 | 1308 | Null | Null |
| 110 | 1320 | 5, 10, 11, 22, 55 | 22, 11, 10, 5, 2 |
| 125 | 1500 | 25 | 5 |
| 126 | 1512 | 9, 14, 18, 21, 42, 63 | 14, 9, 7, 6, 3, 2 |
| 127 | 1524 | Null | Null |
| 128 | 1536 | 8, 16, 32, 64 | 16, 8, 4, 2 |
| 129 | 1548 | 43 | 3 |
| 130 | 1560 | 10, 13, 26, 65 | 13, 10, 5, 2 |
| 131 | 1572 | Null | Null |
| 132 | 1584 | 11, 12, 22, 33, 44, 66 | 12, 11, 6, 4, 3, 2 |
| 133 | 1596 | 7, 19 | 19, 7 |
| 134 | 1608 | 67 | 2 |
| 135 | 1620 | 9, 15, 27, 45 | 15, 9, 5, 3 |
| 136 | 1632 | 8, 17, 34, 68 | 17, 8, 4, 2 |
| 137 | 1644 | Null | Null |
| 200 | 2400 | 10, 20, 25, 40, 50, 100 | 20, 10, 8, 5, 4, 2 |
| 201 | 2412 | 67 | 3 |
| 202 | 2424 | 101 | 2 |
| 203 | 2436 | 29 | 7 |
| 204 | 2448 | 12, 17, 34, 51, 68, 102 | 17, 12, 6, 4, 3, 2 |
| 205 | 2460 | 41 | 5 |
| 206 | 2472 | 103 | 2 |
| 207 | 2484 | 9, 23, 69 | 23, 9, 3 |
| 208 | 2496 | 8, 13, 16, 26, 52, 104 | 26, 16, 13, 8, 4, 2 |
| 209 | 2508 | 11, 19 | 19, 11 |
| 210 | 2520 | 7, 10, 14, 15, 21, 30, 35, 42, 70, 105 | 30, 21, 15, 14, 10, 7, 6, 5, 3, 2 |
| 211 | 2532 | Null | Null |
| 212 | 2544 | 53, 106 | 4, 2 |
| 213 | 2556 | 71 | 3 |
| 214 | 2568 | 107 | 2 |
| 215 | 2580 | 43 | 5 |
| 216 | 2592 | 6, 8, 9, 12, 18, 24, 27, 36, 54, 72, 108 | 36, 27, 24, 18, 12, 9, 8, 6, 4, 3, 2 |
| 217 | 2604 | 7, 31 | 31, 7 |
| 218 | 2616 | 109 | 2 |
| 219 | 2628 | 73 | 3 |
| 220 | 2640 | 10, 11, 20, 22, 44, 55, 110 | 22, 20, 11, 10, 5, 4, 2 |
| 400 | 4800 | 10, 16, 20, 25, 40, 50, 80, 100, 200 | 40, 25, 20, 16, 10, 8, 5, 4, 2 |
| 401 | 4812 | Null | Null |
| 402 | 4824 | 67, 134, 201 | 6, 3, 2 |
| 403 | 4836 | 13, 31 | 31, 13 |
| 404 | 4848 | 101, 202 | 4, 2 |
| 405 | 4860 | 9, 15, 27, 45, 81, 135 | 45, 27, 15, 9, 5, 3 |
| 406 | 4872 | 14, 29, 58, 203 | 29, 14, 7, 2 |
| 407 | 4884 | 11, 37 | 37, 11 |
| 408 | 4896 | 8, 12, 17, 24, 34, 51, 68, 102, 136, 204 | 51, 34, 24, 17, 12, 8, 6, 4, 3, 2 |
| 409 | 4908 | Null | Null |
| 410 | 4920 | 10, 41, 82, 205 | 41, 10, 5, 2 |
| 411 | 4932 | 137 | 3 |
| 412 | 4944 | 103, 206 | 4, 2 |
| 413 | 4956 | 59 | 7 |
| 414 | 4968 | 9, 18, 23, 46, 69, 138, 207 | 46, 23, 18, 9, 6, 3, 2 |
| 415 | 4980 | 83 | 5 |
| 416 | 4992 | 8, 13, 16, 26, 32, 52, 104, 208 | 52, 32, 26, 16, 13, 8, 4, 2 |
| 417 | 5004 | 139 | 3 |
| 418 | 5016 | 11, 19, 22, 38, 209 | 38, 22, 19, 11, 2 |
| 419 | 5028 | Null | Null |
| 420 | 5040 | 7, 10, 12, 14, 15, 20, 21, 28, 30, 35, 42, 60, 70, 84, 105, 140, 210 | 60, 42, 35, 30, 28, 21, 20, 15, 14, 12, 10, 7, 6, 5, 4, 3, 2 |
| 421 | 5052 | Null | Null |
| 422 | 5064 | 211 | 2 |
| 423 | 5076 | 9, 47, 141 | 47, 9, 3 |
| 424 | 5088 | 8, 53, 106, 212 | 53, 8, 4, 2 |
| 425 | 5100 | 17, 25, 85 | 25, 17, 5 |
| 426 | 5112 | 6, 71, 142, 213 | 71, 6, 3, 2 |
| 427 | 5124 | 7, 61 | 61, 7 |
| 428 | 5136 | 107, 214 | 4, 2 |
| 429 | 5148 | 11, 13, 33, 39, 143 | 39, 33, 13, 11, 3 |
| 430 | 5160 | 10, 43, 86, 215 | 43, 10, 5, 2 |
| 431 | 5172 | Null | Null |

TABLE 1-continued

| RB Number | Sub-carrier Number | Interlace Structure (RBs/Interlace) | RB Spacing |
|---|---|---|---|
| 432 | 5184 | 6, 8, 9, 12, 16, 18, 24, 27, 36, 48, 54, 72, 108, 144, 216 | 72, 54, 48, 36, 27, 24, 18, 16, 12, 9, 8, 6, 4, 3, 2 |
| 433 | 5196 | Null | Null |
| 434 | 5208 | 7, 14, 31, 62, 217 | 62, 31, 14, 7, 2 |
| 435 | 5220 | 15, 29, 87, 145 | 29, 15, 5, 3 |
| 436 | 5232 | 109, 218 | 4, 2 |
| 437 | 5244 | 19, 23 | 23, 19 |
| 438 | 5256 | 6, 73, 146, 219 | 73, 6, 3, 2 |
| 439 | 5268 | Null | Null |
| 440 | 5280 | 8, 10, 11, 20, 22, 40, 44, 55, 88, 110, 220 | 55, 44, 40, 22, 20, 11, 10, 8, 5, 4, 2 |

TABLE 2

| RB Number | Sub-carrier Number | Interlace Structure (RBs/Interlace) | RB Spacing |
|---|---|---|---|
| 39 | 468 | 13 | 3 |
| 40 | 480 | 4, 5, 8, 10, 20 | 10, 8, 5, 4, 2 |
| 41 | 492 | Null | Null |
| 42 | 504 | 6, 7, 14, 21 | 7, 6, 3, 2 |
| 43 | 516 | Null | Null |
| 78 | 936 | 6, 13, 26, 39 | 13, 6, 3, 2 |
| 79 | 948 | Null | Null |
| 80 | 960 | 4, 5, 8, 10, 16, 20, 40 | 20, 16, 10, 8, 5, 4, 2 |
| 81 | 972 | 9, 27 | 9, 3 |
| 82 | 984 | 41 | 2 |
| 83 | 996 | Null | Null |
| 84 | 1008 | 4, 6, 7, 12, 14, 21, 28, 42 | 21, 14, 12, 7, 6, 4, 3, 2 |
| 85 | 1020 | 5, 17 | 17, 5 |
| 86 | 1032 | 43 | 2 |
| 156 | 1872 | 6, 12, 13, 26, 39, 52, 78 | 26, 13, 12, 6, 4, 3, 2 |
| 157 | 1884 | Null | Null |
| 158 | 1896 | 79 | 2 |
| 159 | 1908 | 53 | 3 |
| 160 | 1920 | 5, 8, 10, 16, 20, 32, 40, 80 | 32, 20, 16, 10, 8, 5, 4, 2 |
| 161 | 1932 | 7, 23 | 23, 7 |
| 162 | 1944 | 6, 9, 18, 27, 54, 81 | 27, 18, 9, 6, 3, 2 |
| 163 | 1956 | Null | Null |
| 164 | 1968 | 4, 41, 82 | 41, 4, 2 |
| 165 | 1980 | 5, 11, 15, 33, 55 | 33, 15, 11, 5, 3 |
| 166 | 1992 | 83 | 2 |
| 167 | 2004 | Null | Null |
| 168 | 2016 | 4, 6, 7, 8, 12, 14, 21, 24, 28, 42, 56, 84 | 42, 28, 24, 21, 14, 12, 8, 7, 6, 4, 3, 2 |
| 169 | 2028 | 13 | 13 |
| 170 | 2040 | 5, 10, 17, 34, 85 | 34, 17, 10, 5, 2 |
| 171 | 2052 | 9, 19, 57 | 19, 9, 3 |
| 172 | 2064 | 4, 43, 86 | 43, 4, 2 |
| 312 | 3744 | 6, 8, 12, 13, 24, 26, 39, 52, 78, 104, 156 | 52, 39, 26, 24, 13, 12, 8, 6, 4, 3, 2 |
| 313 | 3756 | Null | Null |
| 314 | 3768 | 157 | 2 |
| 315 | 3780 | 5, 7, 9, 15, 21, 35, 45, 63, 105 | 63, 45, 35, 21, 15, 9, 7, 5, 3 |
| 316 | 3792 | 79, 158 | 4, 2 |
| 317 | 3804 | Null | Null |
| 318 | 3816 | 6, 53, 106, 159 | 53, 6, 3, 2 |
| 319 | 3828 | 11, 29 | 29, 11 |
| 320 | 3840 | 5, 8, 10, 16, 20, 32, 40, 64, 80, 160 | 64, 40, 32, 20, 16, 10, 8, 5, 4, 2 |
| 321 | 3852 | 107 | 3 |
| 322 | 3864 | 7, 14, 23, 46, 161 | 46, 23, 14, 7, 2 |
| 323 | 3876 | 17, 19 | 19, 17 |
| 324 | 3888 | 4, 6, 9, 12, 18, 27, 36, 54, 81, 108, 162 | 81, 54, 36, 27, 18, 12, 9, 6, 4, 3, 2 |
| 325 | 3900 | 5, 13, 25, 65 | 65, 25, 13, 5 |
| 326 | 3912 | 163 | 2 |
| 327 | 3924 | 109 | 3 |
| 328 | 3936 | 4, 8, 41, 82, 164 | 82, 41, 8, 4, 2 |

TABLE 2-continued

| RB Number | Sub-carrier Number | Interlace Structure (RBs/Interlace) | RB Spacing |
|---|---|---|---|
| 329 | 3948 | 7, 47 | 47, 7 |
| 330 | 3960 | 5, 6, 10, 11, 15, 22, 30, 33, 55, 66, 110, 165 | 66, 55, 33, 30, 22, 15, 11, 10, 6, 5, 3, 2 |
| 331 | 3972 | Null | Null |
| 332 | 3984 | 4, 83, 166 | 83, 4, 2 |
| 333 | 3996 | 9, 37, 111 | 37, 9, 3 |
| 334 | 4008 | 167 | 2 |
| 335 | 4020 | 5, 67 | 67, 5 |
| 336 | 4032 | 4, 6, 7, 8, 12, 14, 16, 21, 24, 28, 42, 48, 56, 84, 112, 168 | 84, 56, 48, 42, 28, 24, 21, 16, 14, 12, 8, 7, 6, 4, 3, 2 |
| 337 | 4044 | Null | Null |
| 338 | 4056 | 13, 26, 169 | 26, 13, 2 |
| 339 | 4068 | 113 | 3 |
| 340 | 4080 | 4, 5, 10, 17, 20, 34, 68, 85, 170 | 85, 68, 34, 20, 17, 10, 5, 4, 2 |
| 341 | 4092 | 11, 31 | 31, 11 |
| 342 | 4104 | 6, 9, 18, 19, 38, 57, 114, 171 | 57, 38, 19, 18, 9, 6, 3, 2 |
| 343 | 4116 | 7, 49 | 49, 7 |
| 344 | 4128 | 4, 8, 43, 86, 172 | 86, 43, 8, 4, 2 |
| 625 | 7500 | 5, 25, 125 | 125, 25, 5 |
| 626 | 7512 | 313 | 2 |
| 627 | 7524 | 11, 19, 33, 57, 209 | 57, 33, 19, 11, 3 |
| 628 | 7536 | 157, 314 | 4, 2 |
| 629 | 7548 | 17, 37 | 37, 17 |
| 630 | 7560 | 5, 6, 7, 9, 10, 14, 15, 18, 21, 30, 35, 42, 45, 63, 70, 90, 105, 126, 210, 315 | 126, 105, 90, 70, 63, 45, 42, 35, 30, 21, 18, 15, 14, 10, 9, 7, 6, 5, 3, 2 |
| 631 | 7572 | Null | Null |
| 632 | 7584 | 8, 79, 158, 316 | 79, 8, 4, 2 |
| 633 | 7596 | 211 | 3 |
| 634 | 7608 | 317 | 2 |
| 635 | 7620 | 5, 127 | 127, 5 |
| 636 | 7632 | 6, 12, 53, 106, 159, 212, 318 | 106, 53, 12, 6, 4, 3, 2 |
| 637 | 7644 | 7, 13, 49, 91 | 91, 49, 13, 7 |
| 638 | 7656 | 11, 22, 29, 58, 319 | 58, 29, 22, 11, 2 |
| 639 | 7668 | 9, 71, 213 | 71, 9, 3 |
| 640 | 7680 | 5, 8, 10, 16, 20, 32, 40, 64, 80, 128, 160, 320 | 128, 80, 64, 40, 32, 20, 16, 10, 8, 5, 4, 2 |
| 641 | 7692 | Null | Null |
| 642 | 7704 | 6, 107, 214, 321 | 107, 6, 3, 2 |
| 643 | 7716 | Null | Null |
| 644 | 7728 | 7, 14, 23, 28, 46, 92, 161, 322 | 92, 46, 28, 23, 14, 7, 4, 2 |
| 645 | 7740 | 5, 15, 43, 129, 215 | 129, 43, 15, 5, 3 |
| 646 | 7752 | 17, 19, 34, 38, 323 | 38, 34, 19, 17, 2 |
| 647 | 7764 | Null | Null |
| 648 | 7776 | 4, 6, 8, 9, 12, 18, 24, 27, 36, 54, 72, 81, 108, 162, 216, 324 | 162, 108, 81, 72, 54, 36, 27, 24, 18, 12, 9, 8, 6, 4, 3, 2 |
| 649 | 7788 | 11, 59 | 59, 11 |
| 650 | 7800 | 5, 10, 13, 25, 26, 50, 65, 130, 325 | 130, 65, 50, 26, 25, 13, 10, 5, 2 |
| 651 | 7812 | 7, 21, 31, 93, 217 | 93, 31, 21, 7, 3 |
| 652 | 7824 | 4, 163, 326 | 163, 4, 2 |
| 653 | 7836 | Null | Null |
| 654 | 7848 | 6, 109, 218, 327 | 109, 6, 3, 2 |
| 655 | 7860 | 5, 131 | 131, 5 |
| 656 | 7872 | 4, 8, 16, 41, 82, 164, 328 | 164, 82, 41, 16, 8, 4, 2 |
| 657 | 7884 | 9, 73, 219 | 73, 9, 3 |
| 658 | 7896 | 7, 14, 47, 94, 329 | 94, 47, 14, 7, 2 |
| 659 | 7908 | Null | Null |
| 660 | 7920 | 4, 5, 6, 10, 11, 12, 15, 20, 22, 30, 33, 44, 55, 60, 66, 110, 132, 165, 220, 330 | 165, 132, 110, 66, 60, 55, 44, 33, 30, 22, 20, 15, 12, 11, 10, 6, 5, 4, 3, 2 |
| 661 | 7932 | Null | Null |
| 662 | 7944 | 331 | 2 |
| 663 | 7956 | 13, 17, 39, 51, 221 | 51, 39, 17, 13, 3 |
| 664 | 7968 | 4, 8, 83, 166, 332 | 166, 83, 8, 4, 2 |
| 665 | 7980 | 5, 7, 19, 35, 95, 133 | 133, 95, 35, 19, 7, 5 |
| 666 | 7992 | 6, 9, 18, 37, 74, 111, 222, 333 | 111, 74, 37, 18, 9, 6, 3, 2 |

TABLE 2-continued

| RB Number | Sub-carrier Number | Interlace Structure (RBs/Interlace) | RB Spacing |
|---|---|---|---|
| 667 | 8004 | 23, 29 | 29, 23 |
| 668 | 8016 | 4, 167, 334 | 167, 4, 2 |
| 669 | 8028 | 223 | 3 |
| 670 | 8040 | 5, 10, 67, 134, 335 | 134, 67, 10, 5, 2 |
| 671 | 8052 | 11, 61 | 61, 11 |
| 672 | 8064 | 4, 6, 7, 8, 12, 14, 16, 21, 24, 28, 32, 42, 48, 56, 84, 96, 112, 168, 224, 336 | 168, 112, 96, 84, 56, 48, 42, 32, 28, 24, 21, 16, 14, 12, 8, 7, 6, 4, 3, 2 |
| 673 | 8076 | Null | Null |
| 674 | 8088 | 337 | 2 |
| 675 | 8100 | 5, 9, 15, 25, 27, 45, 75, 135, 225 | 135, 75, 45, 27, 25, 15, 9, 5, 3 |
| 676 | 8112 | 4, 13, 26, 52, 169, 338 | 169, 52, 26, 13, 4, 2 |
| 677 | 8124 | Null | Null |
| 678 | 8136 | 6, 113, 226, 339 | 113, 6, 3, 2 |
| 679 | 8148 | 7, 97 | 97, 7 |
| 680 | 8160 | 4, 5, 8, 10, 17, 20, 34, 40, 68, 85, 136, 170, 340 | 170, 136, 85, 68, 40, 34, 20, 17, 10, 8, 5, 4, 2 |
| 681 | 8172 | 227 | 3 |
| 682 | 8184 | 11, 22, 31, 62, 341 | 62, 31, 22, 11, 2 |
| 683 | 8196 | Null | Null |
| 684 | 8208 | 4, 6, 9, 12, 18, 19, 36, 38, 57, 76, 114, 171, 228, 342 | 171, 114, 76, 57, 38, 36, 19, 18, 12, 9, 6, 4, 3, 2 |
| 685 | 8220 | 5, 137 | 137, 5 |
| 686 | 8232 | 7, 14, 49, 98, 343 | 98, 49, 14, 7, 2 |
| 687 | 8244 | 229 | 3 |
| 688 | 8256 | 4, 8, 16, 43, 86, 172, 344 | 172, 86, 43, 16, 8, 4, 2 |

The foregoing example embodiments further describe the objectives and the technical solutions of this application in detail. It should be understood that the foregoing descriptions are merely the embodiments of this application, but are not used to limit the protection scope of this application. Any modification, equivalent replacement, improvement, or the like made based on the technical solutions of this application shall fall within the protection scope of this application.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, and microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like.

What is claimed is:

1. A resource allocation method, comprising:
    allocating a resource group comprising M first resource blocks to a terminal when allocating uplink resources, wherein an occupancy ratio of a frequency spacing formed by the M first resource blocks to a system bandwidth is greater than a preset threshold, and the resource group further comprises N second resource blocks in any frequency domain positions, wherein M≥2, N≥1, and both M and N are positive integers; and
    sending resource indication information to the terminal, wherein the resource indication information comprises information about the resource group,
    wherein the frequency spacing formed by the M first resource blocks is a bandwidth spacing formed in two parts, and
    wherein a first part of the two parts is on a first end of the system bandwidth, and a second part of the two parts is on a second end of the system bandwidth.

2. The method according to claim 1, wherein the M first resource blocks are one or more pairs of resource blocks in a first resource set, an occupancy ratio of a frequency spacing between every pair of resource blocks in the first resource set to the system bandwidth is greater than the preset threshold, and an occupancy ratio of a frequency spacing formed by the N second resource blocks to the system bandwidth is greater than or less than the preset threshold.

3. The method according to claim 2, wherein a same frequency spacing is present between every pair of resource blocks in the first resource set, and the occupancy ratio of the frequency spacing between every pair of resource blocks to the system bandwidth is greater than the preset threshold.

4. The method according to claim 2, wherein frequency spacings of the pairs of resource blocks in the first resource set are in descending order, and an occupancy ratio of a smallest frequency spacing to the system bandwidth is greater than the preset threshold.

5. The method according to claim 1, wherein the M first resource blocks form K resource interlace(s), and an occupancy ratio of a frequency spacing formed by the K resource interlace(s) to the system bandwidth is greater than the preset threshold, wherein K≥1, and K is a positive integer; and the N second resource blocks are some of resource blocks in a resource interlace, and the resource interlace to which the N second resource blocks belong is allocated to a plurality of terminals.

6. The method according to claim 5, wherein the K resource interlace(s) comprise H resource blocks, wherein H is a positive integer, and H is divisible by a total quantity of resource blocks that correspond to each of a plurality of transmission bandwidths corresponding to an unlicensed frequency band.

7. The method according to claim 2, wherein the resource indication information comprises indexes of the one or more pairs of resource blocks in the first resource set; and
    if the N second resource blocks are one or more pairs of resource blocks in the first resource set, the resource indication information further comprises indexes of the one or more pairs of resource blocks corresponding to the N second resource blocks, in the first resource set; or
    if the N second resource blocks are not resource blocks in the first resource set, the resource indication information further comprises resource block numbers of the N second resource blocks.

8. The method according to claim 5, wherein the resource indication information comprises one or more of the following: resource interlace indexes of the K resource interlace(s), a resource interlace index of the resource interlace to which the N second resource blocks belong, or indexes of the N second resource blocks in the resource interlace to which the N second resource blocks belong.

9. The method according to claim 8, wherein the resource indication information further comprises attribute indication information corresponding to the resource interlace, to indicate that the resource interlace is split into a plurality of parts, wherein the plurality of parts are shared by the plurality of terminals.

10. A network device, comprising a processor and a transmitter, wherein:
the processor, configured to allocate a resource group comprising M first resource blocks to a terminal when allocating uplink resources, wherein an occupancy ratio of a frequency spacing formed by the M first resource blocks to a system bandwidth is greater than a preset threshold, and the resource group further comprises N second resource blocks in any frequency domain positions, wherein M≥2, N≥1, and both M and N are positive integers; and
the transmitter, configured to send resource indication information to the terminal, wherein the resource indication information comprises information about the resource group,
wherein the frequency spacing formed by the M first resource blocks is a bandwidth spacing formed in two parts, and
wherein a first part of the two parts is on a first end of the system bandwidth, and a second part of the two parts is on a second end of the system bandwidth.

11. The network device according to claim 10, wherein the M first resource blocks are one or more pairs of resource blocks in a first resource set, an occupancy ratio of a frequency spacing between every pair of resource blocks in the first resource set to the system bandwidth is greater than the preset threshold, and an occupancy ratio of a frequency spacing between the N second resource blocks to the system bandwidth is greater than or less than the preset threshold.

12. The network device according to claim 11, wherein a same frequency spacing is present between every pair of resource blocks in the first resource set, and the occupancy ratio of the frequency spacing between every pair of resource blocks to the system bandwidth is greater than the preset threshold.

13. The network device according to claim 11, wherein frequency spacings of the pairs of resource blocks in the first resource set are in descending order, and an occupancy ratio of a smallest frequency spacing to the system bandwidth is greater than the preset threshold.

14. The network device according to claim 10, wherein the M first resource blocks form K resource interlace(s), and an occupancy ratio of a frequency spacing formed by the K resource interlace(s) to the system bandwidth is greater than the preset threshold, wherein K≥1, and K is a positive integer; and the N second resource blocks are some of resource blocks in a resource interlace, and the resource interlace to which the N second resource blocks belong is allocated to a plurality of terminals.

15. The network device according to claim 14, wherein the K resource interlace(s) comprise H resource blocks, wherein H is a positive integer, and H is divisible by a total quantity of resource blocks that correspond to each of a plurality of transmission bandwidths corresponding to an unlicensed frequency band.

16. The network device according to claim 11, wherein the resource indication information comprises indexes of the one or more pairs of resource blocks in the first resource set; and
if the N second resource blocks are one or more pairs of resource blocks in the first resource set, the resource indication information further comprises indexes of the one or more pairs of resource blocks corresponding to the N second resource blocks, in the first resource set; or
if the N second resource blocks are not resource blocks in the first resource set, the resource indication information further comprises resource block numbers of the N second resource blocks.

17. The network device according to claim 14, wherein the resource indication information comprises resource interlace indexes of the K resource interlace(s), a resource interlace index of the resource interlace to which the N second resource blocks belong, and indexes of the N second resource blocks in the resource interlace to which the N second resource blocks belong.

18. The network device according to claim 10, wherein the resource indication information further comprises attribute indication information corresponding to the resource interlace to which the N second resource blocks belong, to indicate that the resource interlace to which the N second resource blocks belong is split into a plurality of parts, wherein the plurality of parts are shared by the plurality of terminals.

19. The network device according to claim 17, wherein the resource indication information comprises numbers of the M first resource blocks and numbers of the N second resource blocks.

20. A non-transitory computer readable storage medium, comprising instructions, wherein when the instructions are executed by a computer, the computer is configured to perform steps comprising:
allocating a resource group comprising M first resource blocks to a terminal when allocating uplink resources, wherein an occupancy ratio of a frequency spacing formed by the M first resource blocks to a system bandwidth is greater than a preset threshold, and the resource group further comprises N second resource blocks in any frequency domain positions, wherein M≥2, N≥1, and both M and N are positive integers; and
sending resource indication information to the terminal, wherein the resource indication information comprises information about the resource group,
wherein the frequency spacing formed by the M first resource blocks is a bandwidth spacing formed in two parts, and
wherein a first part of the two parts is on a first end of the system bandwidth, and a second part of the two parts is on a second end of the system bandwidth.

* * * * *